(12) United States Patent
Funnell

(10) Patent No.: US 8,930,763 B2
(45) Date of Patent: Jan. 6, 2015

(54) METHOD AND APPARATUS FOR TESTING DATA WAREHOUSES

(75) Inventor: Ian Clive Funnell, Eastwood (AU)

(73) Assignee: Agile Software Pty Limited, Sydney, NSW (AU)

( * ) Notice: Subject to any disclaimer, the term of this patent is extended or adjusted under 35 U.S.C. 154(b) by 232 days.

(21) Appl. No.: 13/524,814

(22) Filed: Jun. 15, 2012

(65) Prior Publication Data

US 2012/0324289 A1 Dec. 20, 2012

(30) Foreign Application Priority Data

Jun. 15, 2011 (AU) ................................ 2011902339

(51) Int. Cl.
*G06F 11/00* (2006.01)
*G06F 11/36* (2006.01)

(52) U.S. Cl.
CPC .................................. *G06F 11/3688* (2013.01)
USPC ............................ 714/38.1; 714/32; 717/168

(58) Field of Classification Search
CPC G06F 11/3672; G06F 11/368; G06F 11/3688
USPC ............................. 714/32, 38.1; 717/124, 168
See application file for complete search history.

(56) References Cited

U.S. PATENT DOCUMENTS

| | | | |
|---|---|---|---|
| 5,673,387 A | 9/1997 | Chen et al. | |
| 5,758,061 A | 5/1998 | Plum | |
| 5,978,940 A | 11/1999 | Newman et al. | |
| 6,061,643 A | 5/2000 | Walker et al. | |
| 6,167,534 A | 12/2000 | Straathof et al. | |
| 6,236,952 B1 | 5/2001 | Jun et al. | |
| 6,381,604 B1 | 4/2002 | Caughran et al. | |
| 6,385,552 B1 | 5/2002 | Snyder | |
| 6,507,842 B1 | 1/2003 | Grey et al. | |
| 6,513,154 B1 | 1/2003 | Porterfield | |
| 6,542,841 B1 | 4/2003 | Snyder | |
| 6,581,052 B1 | 6/2003 | Slutz | |
| 6,581,169 B1 | 6/2003 | Chen et al. | |
| 6,615,253 B1 | 9/2003 | Bowman-Amuah | |
| 6,701,514 B1 | 3/2004 | Haswell et al. | |
| 6,725,399 B1 | 4/2004 | Bowman | |
| 6,745,140 B2 | 6/2004 | Sutton | |
| 6,826,558 B2 | 11/2004 | Slutz | |
| 6,966,013 B2 | 11/2005 | Blum et al. | |
| 7,007,007 B2 | 2/2006 | Slutz | |
| 7,010,546 B1 | 3/2006 | Kolawa et al. | |
| 7,020,572 B2 | 3/2006 | Raph | |
| 7,055,067 B2 | 5/2006 | DiJoseph | |
| 7,069,547 B2 | 6/2006 | Glaser | |
| 7,113,883 B1 | 9/2006 | House et al. | |
| 7,146,572 B2 | 12/2006 | Richardson | |

(Continued)

*Primary Examiner* — Philip Guyton
(74) *Attorney, Agent, or Firm* — Westman, Champlin & Koehler, P.A.

(57) ABSTRACT

Disclosed is a method of qualifying a change to software modules in a data warehouse comprising a database storing a plurality of data sets and said plurality of warehouse software modules, the method comprising determining if a change has been made to any of the software modules; selecting the software modules which are affiliated with the change to construct a reduced schedule of software modules; identifying the tests which are affiliated with the change to thereby identify a reduced set of tests; executing the reduced schedule of warehouse software; running the reduced set of tests; and if no warehouse software execution errors arise and no warehouse test execution errors or failures arise, qualifying the change to the one or more software modules as a success.

7 Claims, 13 Drawing Sheets

(56) References Cited

U.S. PATENT DOCUMENTS

| | | |
|---|---|---|
| 7,165,074 B2 | 1/2007 | Avvari et al. |
| 7,191,326 B2 | 3/2007 | Louden et al. |
| 7,194,475 B2 | 3/2007 | DelMonaco et al. |
| 7,260,184 B1 | 8/2007 | Howard et al. |
| 7,287,040 B2 | 10/2007 | Bolstad et al. |
| 7,287,242 B2 * | 10/2007 | Chang ........................ 717/124 |
| 7,299,216 B1 | 11/2007 | Liang et al. |
| 7,299,382 B2 | 11/2007 | Jorapur |
| 7,313,564 B2 | 12/2007 | Melamed et al. |
| 7,370,043 B1 * | 5/2008 | Shelton et al. ............ 707/690 |
| 7,392,507 B2 | 6/2008 | Kolawa et al. |
| 7,392,509 B2 | 6/2008 | Sinha et al. |
| 7,403,954 B2 | 7/2008 | Bornhoevd et al. |
| 7,406,679 B2 | 7/2008 | Nelin et al. |
| 7,415,487 B2 | 8/2008 | Bell et al. |
| 7,418,695 B2 | 8/2008 | Lam et al. |
| 7,433,804 B2 | 10/2008 | Smith et al. |
| 7,444,342 B1 | 10/2008 | Hall et al. |
| 7,475,289 B2 | 1/2009 | Rosaria et al. |
| 7,478,365 B2 | 1/2009 | West et al. |
| 7,483,546 B2 | 1/2009 | Bär et al. |
| 7,490,319 B2 | 2/2009 | Blackwell et al. |
| 7,493,077 B2 | 2/2009 | Coleman et al. |
| 7,506,311 B2 | 3/2009 | Subramanian et al. |
| 7,509,538 B2 | 3/2009 | Triou, Jr. et al. |
| 7,529,990 B2 | 5/2009 | Haggerty |
| 7,536,406 B2 | 5/2009 | Haselden et al. |
| 7,539,591 B2 | 5/2009 | House et al. |
| 7,581,138 B2 | 8/2009 | Bartucca et al. |
| 7,581,212 B2 | 8/2009 | West et al. |
| 7,603,658 B2 | 10/2009 | Subramanian et al. |
| 7,610,578 B1 | 10/2009 | Taillefer et al. |
| 7,664,712 B1 | 2/2010 | Duvall et al. |
| 7,681,079 B2 | 3/2010 | Xu et al. |
| 7,720,804 B2 | 5/2010 | Fazal et al. |
| 7,739,267 B2 | 6/2010 | Jin et al. |
| 7,747,563 B2 | 6/2010 | Gehring |
| 7,779,036 B2 | 8/2010 | Subramanian et al. |
| 7,831,574 B2 | 11/2010 | Pareek et al. |
| 7,836,431 B2 | 11/2010 | Xu |
| 7,865,780 B2 | 1/2011 | Dipper et al. |
| 8,510,602 B2 * | 8/2013 | Chen ........................ 714/38.1 |
| 2002/0161700 A1 | 10/2002 | Ernst et al. |
| 2003/0041288 A1 | 2/2003 | Kolawa et al. |
| 2003/0212661 A1 | 11/2003 | Avvari et al. |
| 2003/0212924 A1 | 11/2003 | Avvari et al. |
| 2005/0102120 A1 | 5/2005 | Bodin et al. |
| 2005/0131851 A1 | 6/2005 | Seeger et al. |
| 2005/0166115 A1 | 7/2005 | Daume et al. |
| 2005/0257086 A1 | 11/2005 | Triou, Jr. et al. |
| 2005/0283667 A1 | 12/2005 | Batten et al. |
| 2006/0010426 A1 | 1/2006 | Lewis et al. |
| 2006/0036393 A1 | 2/2006 | Raph |
| 2006/0206468 A1 | 9/2006 | Dettinger et al. |
| 2007/0005281 A1 | 1/2007 | Haggerty |
| 2007/0047460 A1 | 3/2007 | Buchan Reynolds et al. |
| 2007/0162894 A1 | 7/2007 | Noller et al. |
| 2007/0234314 A1 | 10/2007 | Godwin et al. |
| 2007/0271483 A1 | 11/2007 | Kolawa et al. |
| 2008/0184206 A1 | 7/2008 | Vikutan |
| 2008/0270992 A1 | 10/2008 | Georgieva et al. |
| 2009/0024551 A1 | 1/2009 | Agrawal et al. |
| 2009/0150447 A1 * | 6/2009 | Anderson et al. ............ 707/200 |
| 2009/0265693 A1 | 10/2009 | Bakowski |
| 2009/0265694 A1 | 10/2009 | Bakowski |
| 2010/0005341 A1 | 1/2010 | Agarwal et al. |
| 2010/0079462 A1 | 4/2010 | Breeds et al. |
| 2010/0082646 A1 | 4/2010 | Meek et al. |
| 2010/0100872 A1 | 4/2010 | Mitra |
| 2010/0153908 A1 | 6/2010 | Sarkar et al. |
| 2011/0016451 A1 | 1/2011 | Gorthi et al. |
| 2011/0016452 A1 | 1/2011 | Gorthi et al. |

* cited by examiner

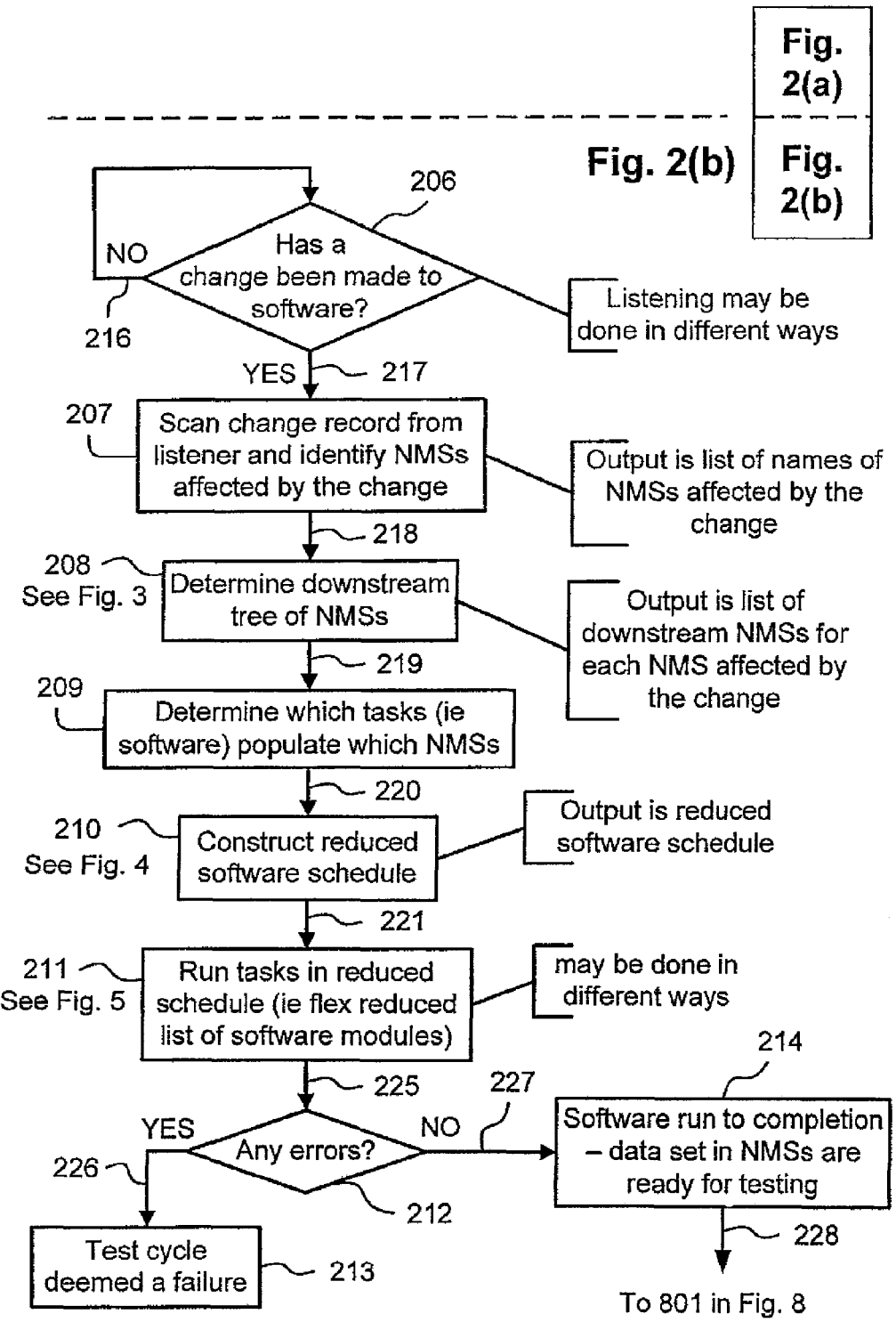

METHOD AND APPARATUS FOR TESTING DATA WAREHOUSES

REFERENCE TO RELATED PATENT APPLICATION(S)

This application claims the benefit under 35 U.S.C. §119 of the filing date of Australian Patent Application No 2011902339, filed 15 Jun. 2011, hereby incorporated by reference in its entirety as if fully set forth herein.

TECHNICAL FIELD OF THE INVENTION

Embodiments of the present invention relate generally to databases and to testing of database software. More particularly, embodiments of the present invention relate to a method and apparatus for testing data warehouse software, and to a computer program product including a computer readable medium having recorded thereon a computer program for testing data warehouse software.

BACKGROUND

Data Warehouses are underpinned by sets of data, referred to as Named Materialized States, or NMSs.

Data Warehouse software moves (or copies, or transfers) data between the NMSs, typically transforming the source (or "loaded") NMSs ultimately into a set of "target" NMSs for the end-users of the data warehouse to query. The data may pass through many intermediate NMSs en route from sources to targets.

Data Warehouse software may be written directly ("by hand"), or may be produced indirectly by the use of a software development tool (sometimes also known as a "workbench" or "integrated development environment").

Each individual component of the software (referred to as a "module") typically takes data from one or more NMSs and transfers it to its own, intermediate, target NMS (or NMSs) using Structured Query Language (SQL) or procedural logic (such as Oracle's PL/SQL). This is referred to as a "task".

This dependency that data warehousing Tasks have on data means that warehouse software is vulnerable to unintended "side effects", where a change to one warehouse software module for a specific purpose can have a dramatic and unexpected effect on the behaviour of the warehouse software in some other, seemingly unrelated module.

The tasks of the software must be executed in a clearly defined order to ensure that the "target" NMSs get populated with the correct data. This ordered set of tasks is referred to as a "schedule".

Data warehouses typically contain large amounts of data. It can be very time consuming to execute the data warehouse software and process large volumes of data during meaningful testing. Similarly, simply running tests against large volumes of data can also be very time consuming.

SUMMARY

It is an object of the present invention to substantially overcome, or at least ameliorate, one or more disadvantages of existing arrangements. Disclosed are arrangements, referred to in this specification as Reduced Testing ("RT") arrangements, which seek to address the above problems by, in regard to a change effected to a warehouse software module, (a) determining from the complete schedule of warehouse software modules and a comprehensive set of warehouse tests, only those software modules (referred to as a reduced schedule of warehouse software modules) and those tests (referred to as a reduced set of tests) which have to be used in order to determine whether the change in the software is acceptable, and then (b) executing the reduced schedule of software modules (also referred to as flexing the software modules) and executing the reduced set of tests.

The RT arrangement is a method and system for performing Continuous Integration Testing ("CIT") or Regression Testing as part of the agile test driven development of Data Warehouse software.

According to a first aspect of the present invention, there is provided a method of qualifying a change to one or more software modules in a plurality of software modules in a data warehouse, said data warehouse comprising a database storing a plurality of data sets and said plurality of warehouse software modules, wherein prior to effecting the change to the one or more software modules, test data has been loaded into the data warehouse, a complete schedule of the plurality of software modules has been executed to populate the data sets from the loaded test data, and a complete set of warehouse tests has been run, and found to pass, in regard to the populated data sets, the method comprising the steps of:

determining if a change has been made to any of the plurality of software modules;

selecting from the plurality of software modules the software modules which are affiliated with the change to thereby construct a reduced schedule of software modules;

identifying from the complete set of warehouse tests the tests which are affiliated with the change to thereby identify a reduced set of tests;

executing the reduced schedule of warehouse software whilst continuing to respect the order of the software modules in the complete schedule;

running the reduced set of tests; and if no warehouse software execution errors arise from execution of the reduced schedule of warehouse software, and no warehouse test execution errors or failures arise from execution of the reduced set of tests, qualifying the change to the one or more software modules as a success, or otherwise as a failure According to another aspect of the present invention, there is provided an apparatus for implementing any one of the aforementioned methods.

According to another aspect of the present invention, there is provided a computer program product including a computer readable medium having recorded thereon a computer program for implementing any one of the methods described above.

Other aspects of the invention are also disclosed.

BRIEF DESCRIPTION OF THE DRAWINGS

Some aspects of the prior art and at least one embodiment of the present invention will now be described with reference to the drawings, in which:

FIGS. 2A and 2B are flow diagram fragments depicting an example of a process for flexing the warehouse software in a data warehouse according to one RT arrangement;

DETAILED DESCRIPTION

Figure 1A:
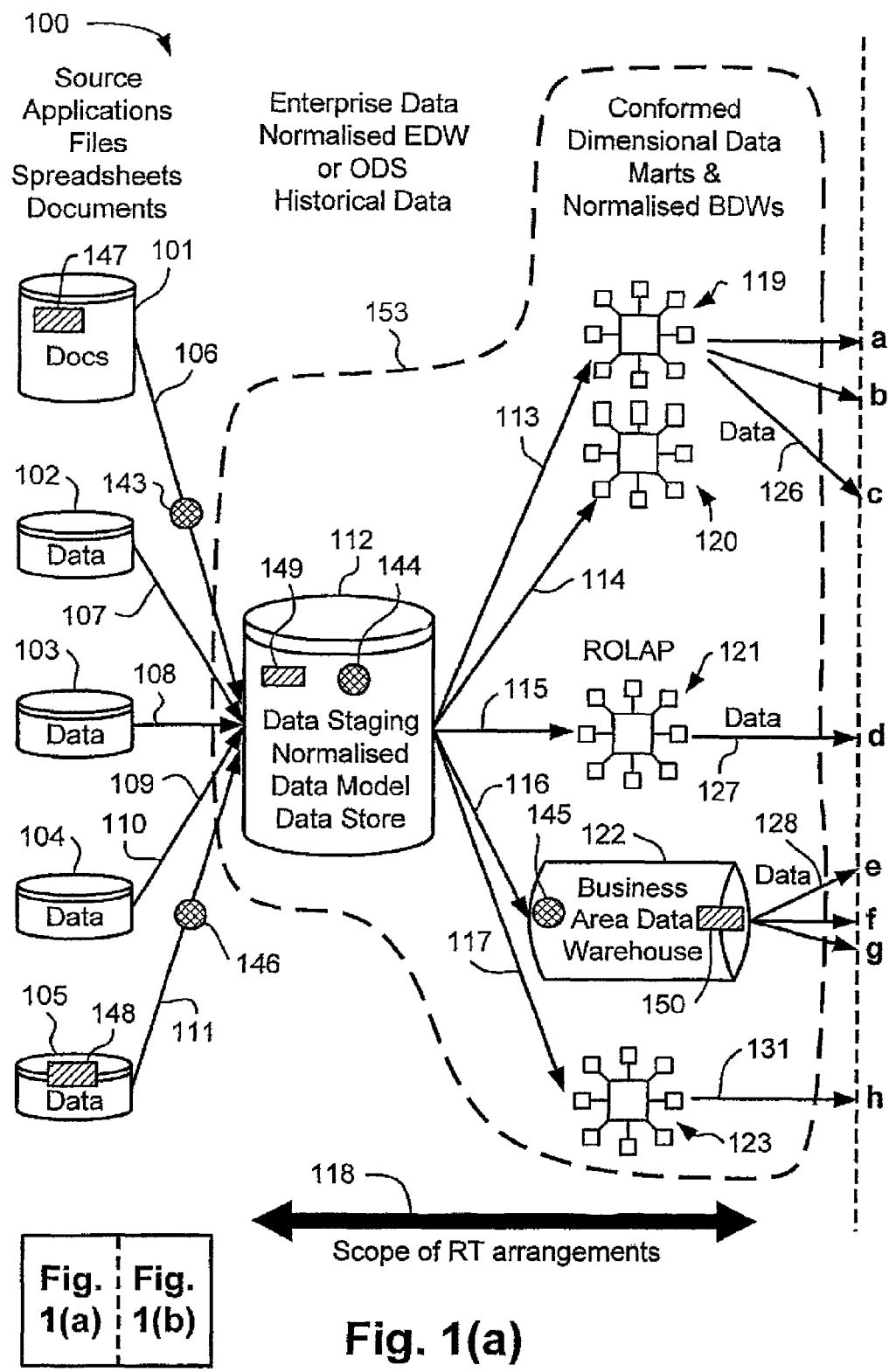
FIGS. 1A and 1B show a functional/data block diagram of a practical data warehouse system upon which the disclosed RT arrangements can be practiced.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of devices that may form public knowledge through their use. Such discussions are not a representation by the present inventor(s) or the patent applicant that such documents or devices in any way form part of the common general knowledge in the art.

As noted above, the RT arrangements, in regard to a change to one or more warehouse software modules, (a) determine from the complete schedule of warehouse software modules and a comprehensive set of warehouse tests, only those software modules (referred to as a reduced schedule of warehouse software modules) and those tests (referred to as a reduced set of tests) which are affiliated with the change and thus have to be used in order to determine whether the change in the software is acceptable, and then (b) execute the reduced schedule of software modules (also referred to as flexing the software modules) and execute the reduced set of tests to thereby qualify the one or more changed warehouse software modules. The term "qualify" is described below in terms of the outcomes of the execution of the reduced schedule of software modules, and the execution of the reduced set of tests.

Figure 11:
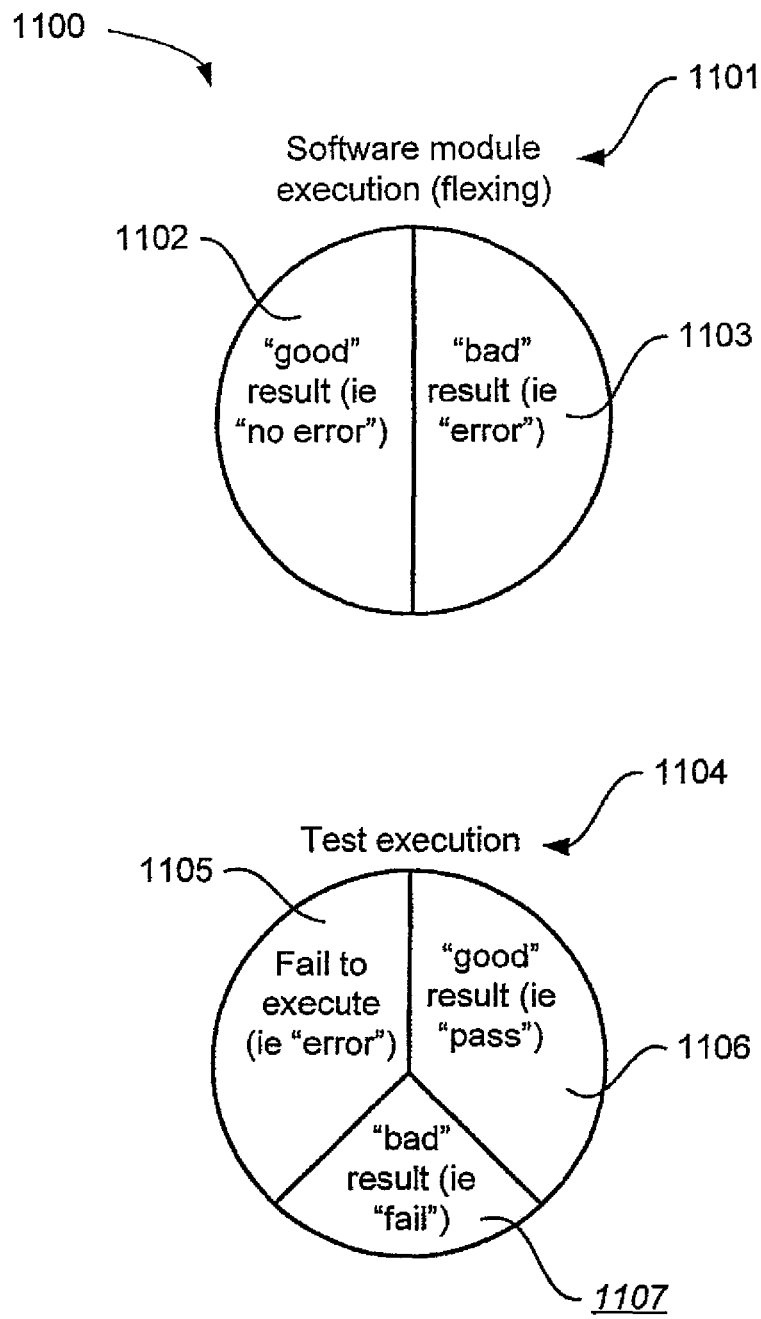
FIG. 11 depicts possible outcomes and associated terminology associated with the RT process.

FIG. 11 provides the terminology 1100 used in that description. When considering software module execution (i.e., flexing) 1101, the outcome can be a "good" result 1102, i.e., a result in which no error arises, or the outcome can be a "bad" result 1103, i.e., a result in which an error arises. When considering test execution 1104, the test may fail to execute properly in which the outcome is referred to as an "error" 1105, or the test may execute properly and if the outcome is a "good" result then the test is said to "pass" 1106, or the test may execute properly and if the outcome is a "bad" result then the test is said to "fail" 1107.

The term "qualify" is the process used to determine if the changed warehouse software module has performed correctly by (c) not causing any flexing errors 1103 (see 909 in FIG. 9) (also referred to as warehouse software execution errors) to arise when the warehouse software is flexed using the reduced schedule of warehouse software modules, and (d) not causing any warehouse test execution errors 1105 or failures 1107 (see 914 in FIG. 9) to arise when the warehouse data sets (also referred to as NMSs) are subjected to the reduced set of tests, in which case the changes to the warehouse software module are qualified as a success. Otherwise, the changes are qualified as a failure. In the described RT example, affiliated software modules are those software modules which are identified by the steps 209 and 210 in FIG. 2B (which in turn use information obtained from steps 301, 303, 305 and 307 in FIG. 3). Affiliated tests are those tests that are identified in a step 801 in FIG. 8.

Figure 1B:
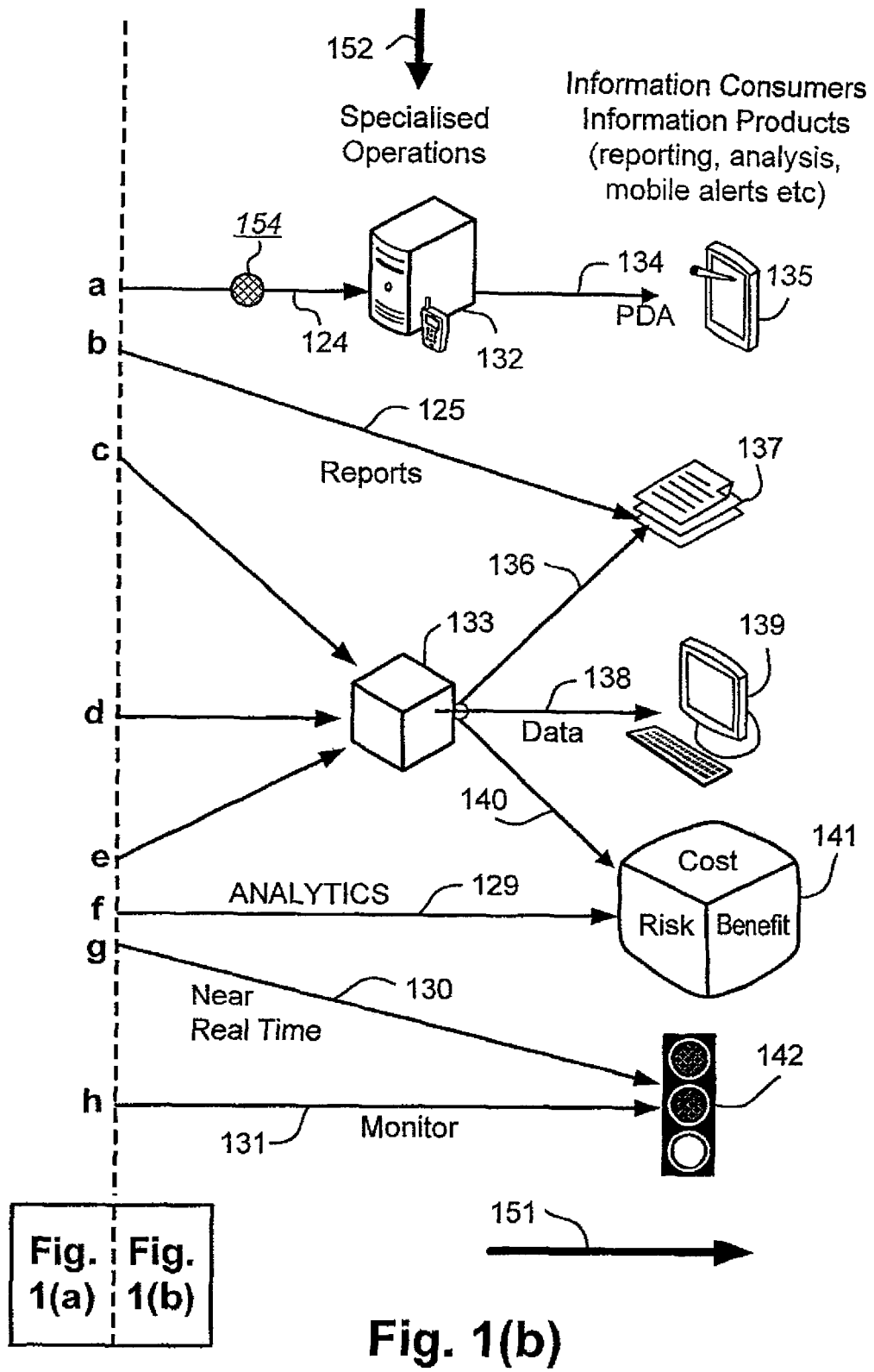

FIGS. 1A and 1B show a functional/data block diagram of a typical practical data warehouse system 100 upon which the disclosed RT arrangements can be practiced.

A data warehouse is a copy of live data, maintained for the purposes of reporting and analysis. Many architecture variants may be used to implement a data warehouse, such variants including staging areas, data marts, star schemas, operational data stores, normalised areas containing historical data with time variance, and de-normalised data structures.

The data warehouse in this description is contained within a dashed line 153. Data generally flows from left to right in the system 100, from sources 101-105 towards information products 135, 137, 139, 141, and 142. Numerous software modules (also referred to as warehouse software entities in this description) depicted by cross hatched circles 143-146 are distributed throughout the system 100.

Some of these software modules such as 143 and 146 load data from respective sources 101, 105 into the data warehouse 153. Other software modules such as 154 enable a user 135 to query the data warehouse 153, via a specialised operation device 132 in the present example. The software modules 144 and 145 which reside within the data warehouse 153 are referred to as warehouse software modules, and the present specification is concerned with these modules, not those residing outside the dashed line 153.

Execution of the warehouse software modules 144, 145 moves and processes the data within the data warehouse 153 after the data has been uploaded into the warehouse 153 from the sources 101-105.

Figure 10:
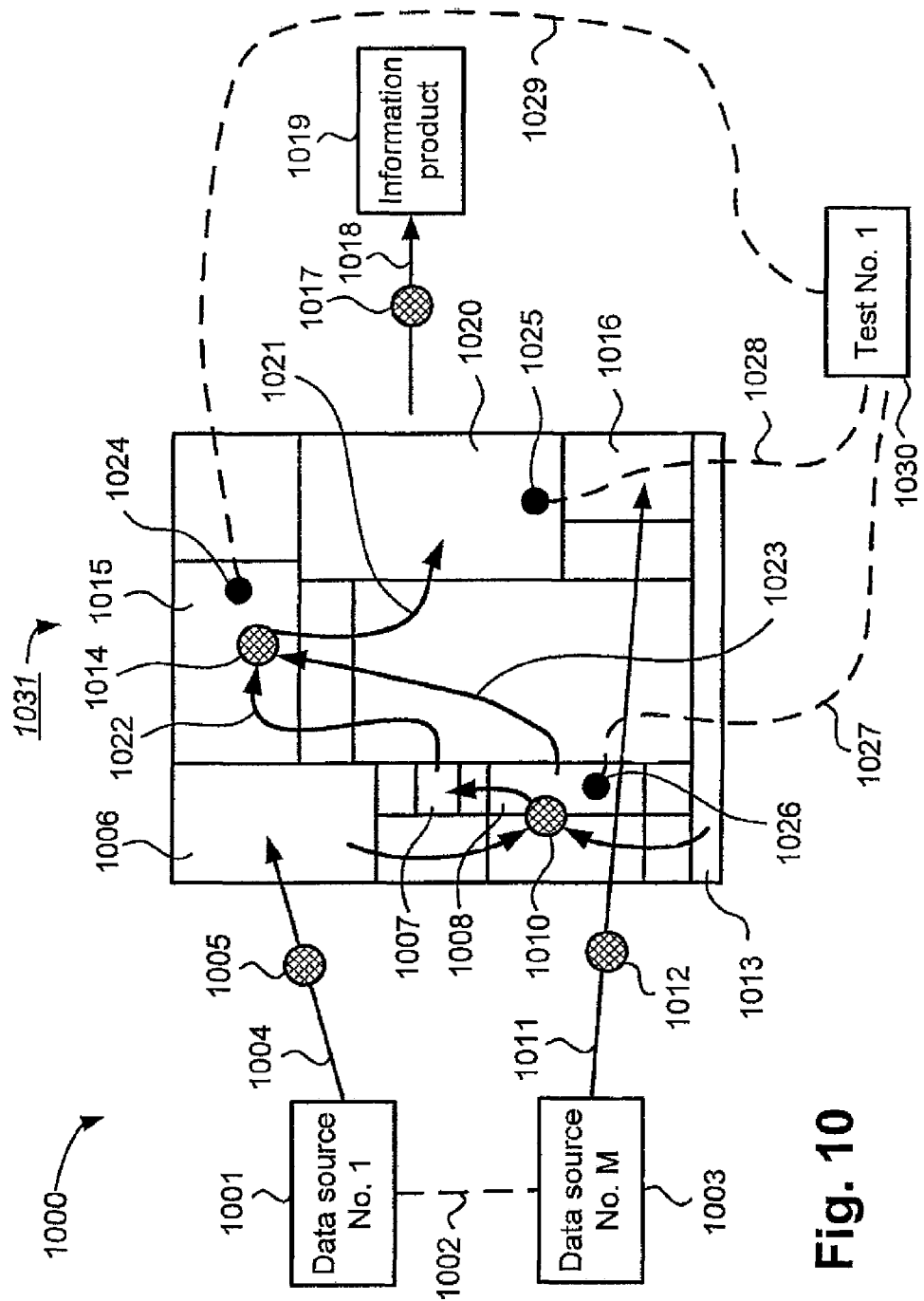
FIG. 10 shows a simplified representation of the warehouse system of FIGS. 1A and 1B.

FIG. 10 shows a simplified representation 1000 of the warehouse system 100 of FIGS. 1A and 1B.

The system 1000 has a number of data sources 1001, ..., 1003. A software module 1005 uploads data from the source 1001, as depicted by an arrow 1004, into a data warehouse 1031.

The warehouse 1031 has numerous "tiles" such as 1006, 1015 and so on, each such tile depicting data in the warehouse 1031. Accordingly, the warehouse can be visualized as containing a collection of these "pieces" of data.

Data is typically stored, in data warehouses, in tables, views, partitions, materialized views, index views, join indexes, index-organized tables, and so on. The terms "data sets" and Named Materialised States "NMS" are used in the present specification to refer to any of the aforementioned, or similar/equivalent, objects in which data can be stored. An NMS may be thought of as a table, however the NMS does not have to be a table, and is not restricted to the form of a table. The "tiles" or "pieces of data" referred to above are referred to, in this specification, as NMSs.

It is noted that the "data warehouse" is made up of the set of all NMS's. Furthermore, there is no data in the data warehouse which isn't in an NMS. NMSs can overlap to a relatively minor degree. One example is a database "view" object. However, there can be no gaps, and thus all data in an RDBMS is in an NMS.

A large data warehouse may contain tens of thousands of NMS's, many of which have no purpose other than to fulfil specific detailed technical needs of the warehouse software. In many of these intermediary NMSs, "semantic synchronization" is broken. In other words, these intermediate NMSs are vital to the correct functioning of the data warehouse as a whole, and yet these intermediate NMSs have no direct business purpose in themselves, and their contents may bear little resemblance to either the source or the target data.

As data flows from the sources 1001, . . . , 1003 to the information product 1019, each NMS in the warehouse 1031 is populated in turn by execution of corresponding warehouse software modules which extract and/or process some or all the data from any number of other NMS's (and often including the target NMS itself). Thus, for example, an NMS 1020 may be populated, as depicted by data flows 1021, 1022 and 1023 by execution of a warehouse software module 1014 which receives data from respective NMSs 1007 and 1008. By inference, other NMSs and warehouse software modules that have not been explicitly referred to in the aforementioned example may also affect the value of the NMS 1020 by virtue of the fact that they are upstream of 1007 and 1008 (software module 1010, and NMSs 1006 and 1013 are an example of this shown in FIG. 10).

Individual warehouse software modules such as 1014 are also referred to as "tasks" or "data flows". Execution of warehouse software modules is also referred to as "flexing" the modules.

The data in the warehouse may be subjected to one or more tests, as depicted by a box entitled "Test No. 1" having a reference numeral 1030. Tests such as 1030 do not process or move data in the warehouse 1031 in any way: all the tests are entirely read-only. Instead the tests are performed by just inspecting the data in the NMSs in the warehouse, using SQL to determine whether the test passes or fails. Thus for example, Test No. 1 may look at a data item 1026 in the NMS 1008, and at a data item 1024 in the NMS 1015, and then determine if a data item 1025 in the NMS 1020 is equal to the sum of the aforementioned data items 1024 and 1026. If this is the case, then test No. 1 is successful. If not then the test fails.

The warehouse software may include procedural logic (loops, if/then etc), but data manipulation is always underpinned by Structured Query Language (SQL).

The warehouse software which moves and copies the data between NMSs within a database is known generically as Extraction, Load, and Transform (ELT) software. In this specification, this software is referred to as data warehouse software. The term "warehouse software" can be used to describe either a single warehouse software module such as 1014, or a set of such warehouse software modules, or all the warehouse software modules in the warehouse 1031.

As noted above, in data warehouse systems data is stored NMSs, which may be tables, heap-organised tables, views, partitions, materialized views, snapshots, index views, join indexes, index-organized tables, "external tables" (as used by Oracle) or other data storage structures inside an RDBMS. Common characteristics of these NMSs include the following:

NMSs have a name or identifier which uniquely identifies them;
NMSs contain real data (the data is visible, it can be queried, and it is "materialized" in the sense that it can't suddenly disappear on its own—thus including views); and
The data contained by NMSs is in some well-known state, which fulfils some technical or business purpose, and has some characteristics (e.g., "is unique", "is not unique", "has a primary key", "contains the list of things that the Marketing Department call 'segments'", etc.)

A data warehouse can be implemented in three continuously cycling phases, namely a development phase, a testing phase, and an operational phase (also referred to as a "live" phase or a "production" phase). The phases may range from long (years) or short (hours) in duration.

During the development phase, system developers develop the warehouse software using dedicated infrastructure, software development software tools, and development phase test data, this infrastructure being referred to as the development platform, or the development environment.

In order to execute the warehouse software modules (also referred to as "flexing" the warehouse software modules), the approach is to run the modules in some logical order which is defined and set up carefully by the system developers to make sure the warehouse software works properly. This carefully set up ordered list of software is known as a software schedule.

Practical timing and optimization considerations often mean that the schedule is very complex, with some data flows (also referred to as software modules) being allowed to run in parallel, and others having many pre-requisites that must be completed before the data flows are allowed to start.

Once the system developers are satisfied that the development phase is complete, i.e. that the developed data warehouse system operates as it should, then the warehouse software that they have developed is ported (is "promoted") onto a different dedicated infrastructure for the test phase, this infrastructure being referred to as the test platform, or the test environment, which is described in more detail with reference to FIGS. 6A and 6B.

The disclosed RT arrangements are used in the test phase. During the test phase, testing personnel, acting in a supervisory role as the testing is typically automatic, test the warehouse software developed in the development phase, using an RT software application 633, test phase test data 201, and a complete schedule of software 205 (see FIGS. 2 and 6A)

Once the test personnel are satisfied that the test phase has been successful (where success in this phase is described in section RT), then the warehouse software that they have tested is promoted onto a different dedicated infrastructure for the operational phase, this infrastructure being referred to as the operational platform, or the operational environment, or the live environment. During the operational phase, users such as 1019 in FIG. 10 access data in the warehouse 1031 by means of queries supported by software modules such as 1017.

At this point, the warehouse software running on the development platform, the test platform and the production platform is synchronised (i.e., identical).

If changes are to be made to any of the warehouse software, ideally these changes are made to the software running on the development platform, and a comprehensive development phase is implemented to ensure that the "new" software operates as it should. At this point, the warehouse software running on the development platform is different to the software running on the test and the production platforms.

Once the new software is found to be correctly functioning on the development platform, as determined by the software developers using any preferred method, the software is promoted to the test platform for testing, at which time the warehouse software running on the development and the test platforms is the same, this being different to the warehouse software running on the production platform. After the testing on the test platform is successful, the new software is promoted onto the operational platform for "real world" operation, at which time the warehouse software running on all three platforms is the same.

Although the various phases associated with development, testing and operation of a data warehouse have been described using three dedicated platforms in the example above, the RT arrangements can be used in systems using fewer or more platforms. Furthermore, although a particular sequence of activities has been described in the above example for addressing "new" warehouse software, the RT arrangements can be used with systems using other sequences of operations. Furthermore, although promotion of software has been described in moving between the various phases, the software on each platform may simply be amended to reflect changes as appropriate.

Figure 6A:
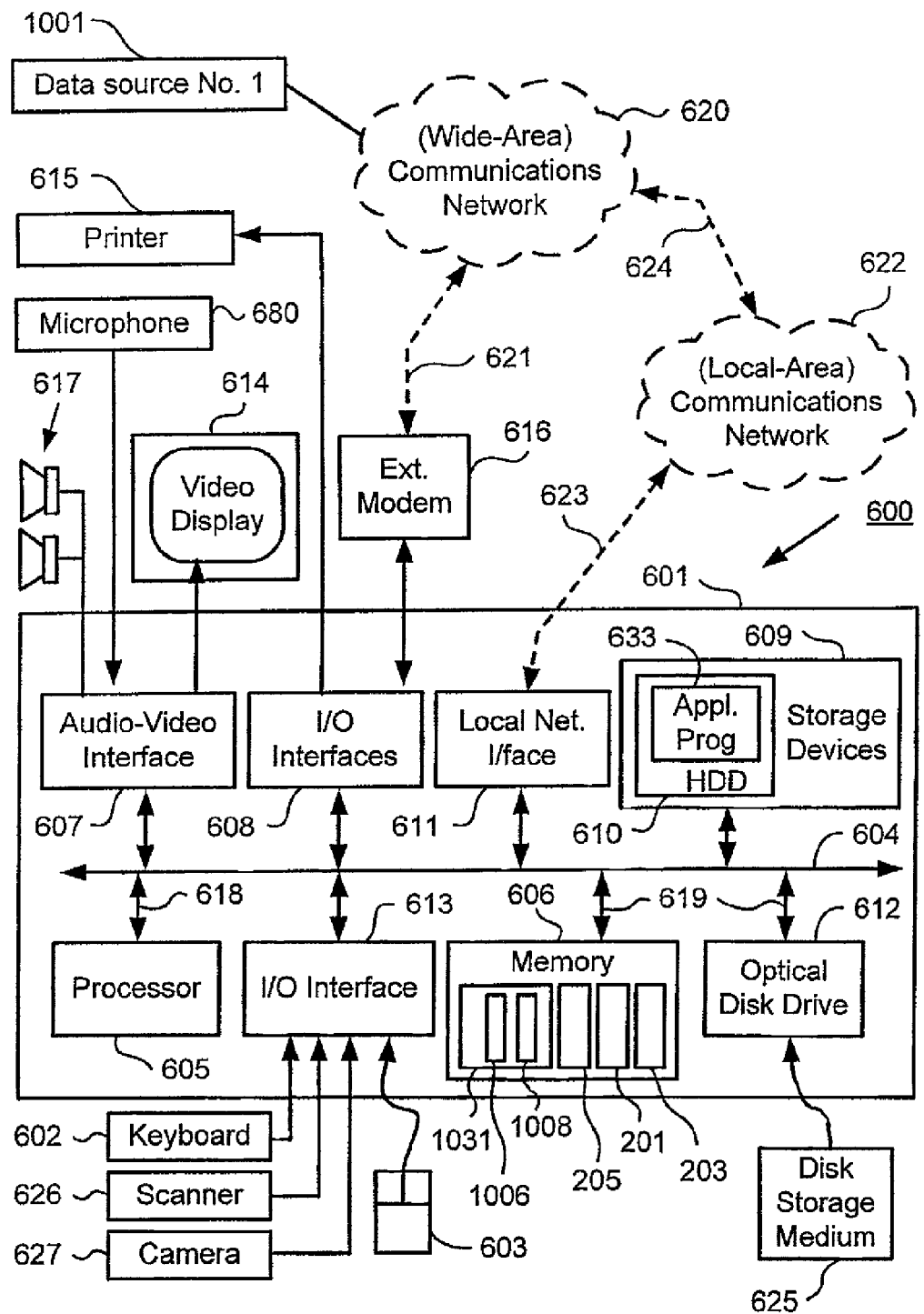
FIGS. 6A and 6B form a schematic block diagram of a general-purpose computer system upon which one or more of the development environment, the test environment, and the live environment for the data warehouse system of FIGS. 1A and 1B can be implemented.
Figure 6B:
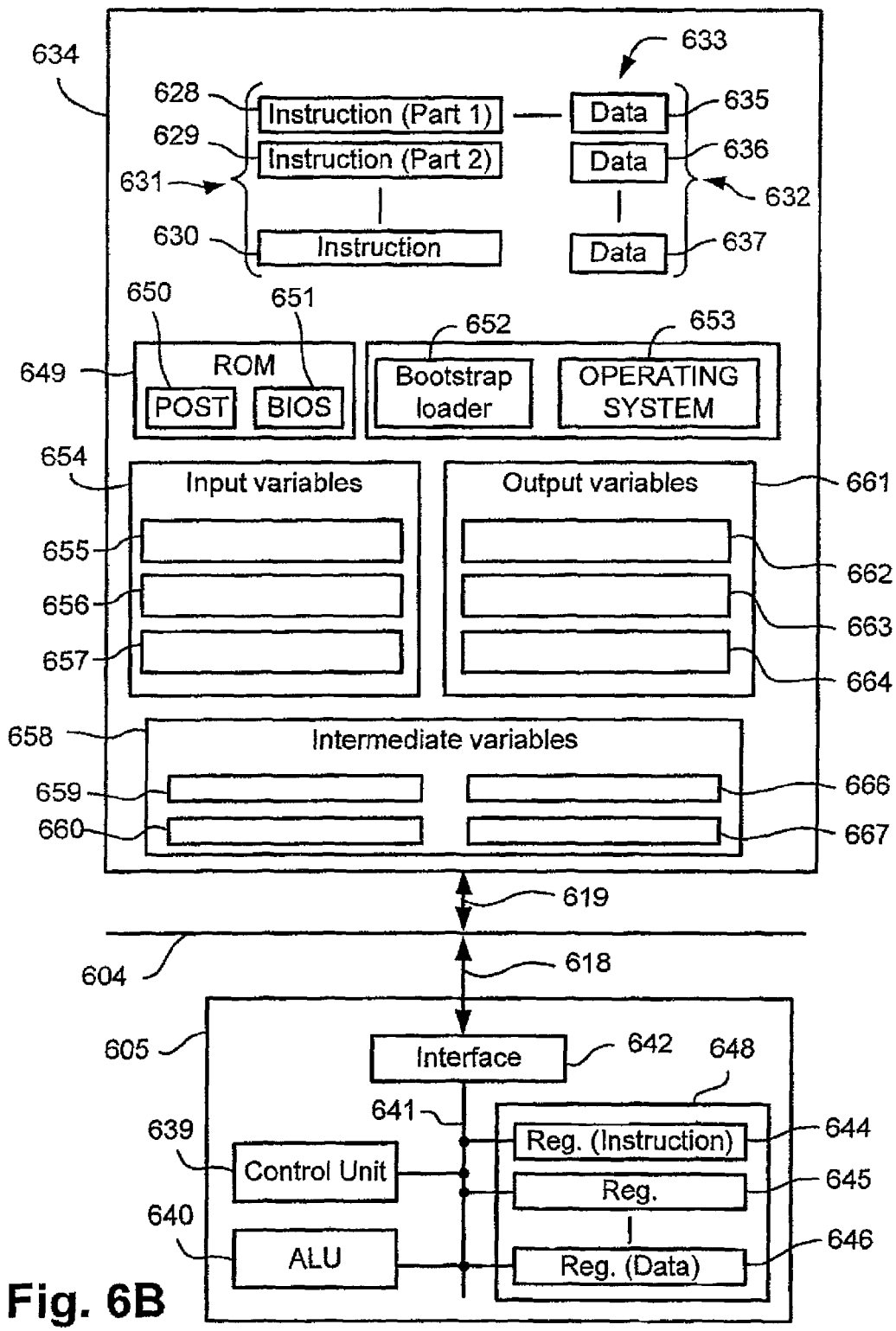
Figure 7:
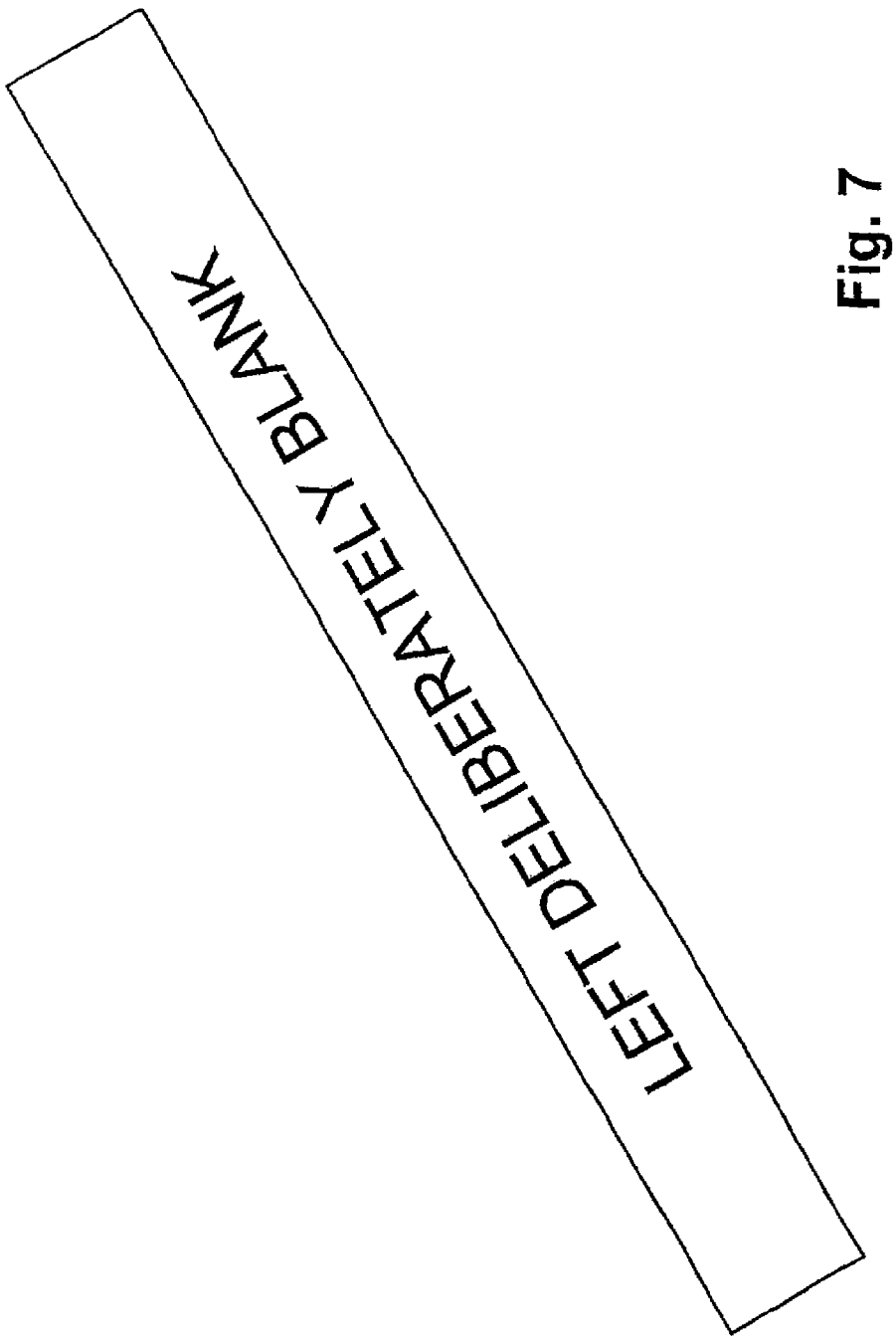
FIG. 7 has been left deliberately blank.

FIGS. 6A and 6B form a schematic block diagram of a general-purpose computer system 600 upon which a data warehouse in one or more of the development environment, the test environment, and the live environment for the data warehouse system of FIGS. 1A and 1B can be implemented.

In the following description, the computer system 600 is described as a data warehouse in the test environment, this being the environment in which the RT arrangements are practiced. However, it is noted that similar structural and functional systems can be used to implement the development and the live environments.

As seen in FIG. 6A, the computer system 600 (i.e., the data warehouse 600) includes a computer module 601; input devices such as a keyboard 602, a mouse pointer device 603, a scanner 626, a camera 627, and a microphone 680; and output devices including a printer 615, a display device 614 and loudspeakers 617. An external Modulator-Demodulator (Modem) transceiver device 616 may be used by the computer module 601 for communicating, for example, to and from the data source 1001 over a communications network 620 via a connection 621. The communications network 620 may be a wide-area network (WAN), such as the Internet, a cellular telecommunications network, or a private WAN. Where the connection 621 is a telephone line, the modem 616 may be a traditional "dial-up" modem. Alternatively, where the connection 621 is a high capacity (e.g., cable) connection, the modem 616 may be a broadband modem. A wireless modem may also be used for wireless connection to the communications network 620.

The computer module 601 typically includes at least one processor unit 605, and a memory unit 606. For example, the memory unit 606 may have semiconductor random access memory (RAM) and semiconductor read only memory (ROM). The computer module 601 also includes an number of input/output (I/O) interfaces including: an audio-video interface 607 that couples to the video display 614, loudspeakers 617 and microphone 680; an I/O interface 613 that couples to the keyboard 602, mouse 603, scanner 626, camera 627 and optionally a joystick or other human interface device (not illustrated); and an interface 608 for the external modem 616 and printer 615. In some implementations, the modem 616 may be incorporated within the computer module 601, for example within the interface 608. The computer module 601 also has a local network interface 611, which permits coupling of the computer system 600 via a connection 623 to a local-area communications network 622, known as a Local Area Network (LAN).

As illustrated in FIG. 6A, the local communications network 622 may also couple to the wide network 620 via a connection 624, which would typically include a so-called "firewall" device or device of similar functionality. The local network interface 611 may comprise an Ethernet™ circuit card, a Bluetooth™ wireless arrangement or an IEEE 802.11 wireless arrangement; however, numerous other types of interfaces may be practiced for the interface 611.

The I/O interfaces 608 and 613 may afford either or both of serial and parallel connectivity, the former typically being implemented according to the Universal Serial Bus (USB) standards and having corresponding USB connectors (not illustrated). Storage devices 609 are provided and typically include a hard disk drive (HDD) 610. Other storage devices such as a floppy disk drive and a magnetic tape drive (not illustrated) may also be used. An optical disk drive 612 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 600.

The components 605 to 613 of the computer module 601 typically communicate via an interconnected bus 604 and in a manner that results in a conventional mode of operation of the computer system 600 known to those in the relevant art. For example, the processor 605 is coupled to the system bus 604 using a connection 618 Likewise, the memory 606 and optical disk drive 612 are coupled to the system bus 604 by connections 619. Examples of computers on which the described arrangements can be practised include IBM-PC's and compatibles, Sun Sparcstations, Apple Mac or a like computer systems.

The RT method may be implemented using the computer system 600 wherein the processes of FIGS. 2, 3, 4, 8 and 9, to be described, may be implemented as one or more RT software application programs 633 executable within the computer system 600. The RT software typically resides in 633, and the data typically resides in 610, 609, and 625. In particular, the steps of the RT method are effected by instructions 631 (see FIG. 6B) in the RT software 633 that are carried out within the computer system 600. The software instructions 631 may be formed as one or more code modules, each for performing one or more particular tasks. The RT software may also be divided into two separate parts, in which a first part and the corresponding code modules performs the RT methods and a second part and the corresponding code modules manage a user interface between the first part and the user.

The RT software may be stored in a computer readable medium, including the storage devices described below, for example. The RT software is loaded into the computer system 600 from the computer readable medium, and then executed by the computer system 600. A computer readable medium having such software or computer program recorded on the computer readable medium is a computer program product. The use of the computer program product in the computer system 600 preferably affects an advantageous apparatus for Reduced Testing of data warehouse software.

The RT software 633 is typically stored in the HDD 610 or the memory 606. The RT software is loaded into the computer system 600 from a computer readable medium, and executed by the computer system 600. Thus, for example, the RT software 633 may be stored on an optically readable disk storage medium (e.g., CD-ROM) 625 that is read by the optical disk drive 612. A computer readable medium having such software or computer program recorded on it is a computer program product. The use of the computer program product in the computer system 600 preferably affects an apparatus for performing Reduced Testing.

In some instances, the application programs 633 may be supplied to the user encoded on one or more CD-ROMs 625 and read via the corresponding drive 612, or alternatively may be read by the user from the networks 620 or 622. Still further, the RT software can also be loaded into the computer system 600 from other computer readable media. Computer readable storage media refers to any non-transitory tangible storage medium that provides recorded instructions and/or data to the computer system 600 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 601. Examples of transitory or non-tangible computer readable transmission media that may also participate in the provision of software, application programs, instructions and/or data to the computer module 601 include radio or infra-red transmission channels as well as a network connection to another computer or networked device, and the Internet or Intranets including e-mail transmissions and information recorded on Websites and the like.

The second part of the application programs 633 and the corresponding code modules mentioned above may be executed to implement one or more graphical user interfaces (GUIs) to be rendered or otherwise represented upon the display 614. Through manipulation of typically the keyboard 602 and the mouse 603, a user of the computer system 600 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 617 and user voice commands input via the microphone 680.

FIG. 6A also shows a number of other software modules in the storage device 606. These include warehouse software 669 which is to be flexed and tested using the RT application 633, a complete software schedule 205 indicating in what sequence and order the warehouse software modules are to be flexed, a comprehensive set of test data 201 with which to populate the warehouse for the test phase, and a repository of tests 203 to be used in the testing phase.

FIG. 6B is a detailed schematic block diagram of the processor 605 and a "memory" 634. The memory 634 represents a logical aggregation of all the memory modules (including the HDD 609 and semiconductor memory 606) that can be accessed by the computer module 601 in FIG. 6A.

When the computer module 601 is initially powered up, a power-on self-test (POST) program 650 executes. The POST program 650 is typically stored in a ROM 649 of the semiconductor memory 606 of FIG. 6A. A hardware device such as the ROM 649 storing software is sometimes referred to as firmware. The POST program 650 examines hardware within the computer module 601 to ensure proper functioning and typically checks the processor 605, the memory 634 (609, 606), and a basic input-output systems software (BIOS) module 651, also typically stored in the ROM 649, for correct operation. Once the POST program 650 has run successfully, the BIOS 651 activates the hard disk drive 610 of FIG. 6A. Activation of the hard disk drive 610 causes a bootstrap loader program 652 that is resident on the hard disk drive 610 to execute via the processor 605. This loads an operating system 653 into the RAM memory 606, upon which the operating system 653 commences operation. The operating system 653 is a system level application, executable by the processor 605, to fulfil various high level functions, including processor management, memory management, device management, storage management, software application interface, and generic user interface.

The operating system 653 manages the memory 634 (609, 606) to ensure that each process or application running on the computer module 601 has sufficient memory in which to execute without colliding with memory allocated to another process. Furthermore, the different types of memory available in the system 600 of FIG. 6A must be used properly so that each process can run effectively. Accordingly, the aggregated memory 634 is not intended to illustrate how particular segments of memory are allocated (unless otherwise stated), but rather to provide a general view of the memory accessible by the computer system 600 and how such is used.

As shown in FIG. 6B, the processor 605 includes a number of functional modules including a control unit 639, an arithmetic logic unit (ALU) 640, and a local or internal memory 648, sometimes called a cache memory. The cache memory 648 typically include a number of storage registers 644-646 in a register section. One or more internal busses 641 functionally interconnect these functional modules. The processor 605 typically also has one or more interfaces 642 for communicating with external devices via the system bus 604, using a connection 618. The memory 634 is coupled to the bus 604 using a connection 619.

The application program 633 includes a sequence of instructions 631 that may include conditional branch and loop instructions. The program 633 may also include data 632 which is used in execution of the program 633. The instructions 631 and the data 632 are stored in memory locations 628, 629, 630 and 635, 636, 637, respectively. Depending upon the relative size of the instructions 631 and the memory locations 628-630, a particular instruction may be stored in a single memory location as depicted by the instruction shown in the memory location 630. Alternately, an instruction may be segmented into a number of parts each of which is stored in a separate memory location, as depicted by the instruction segments shown in the memory locations 628 and 629.

In general, the processor 605 is given a set of instructions which are executed therein. The processor 1105 waits for a subsequent input, to which the processor 605 reacts to by executing another set of instructions. Each input may be provided from one or more of a number of sources, including data generated by one or more of the input devices 602, 603, data received from an external source across one of the networks 620, 602, data retrieved from one of the storage devices 606, 609 or data retrieved from a storage medium 625 inserted into the corresponding reader 612, all depicted in FIG. 6A. The execution of a set of the instructions may in some cases result in output of data. Execution may also involve storing data or variables to the memory 634.

The disclosed RT arrangements use input variables 654, which are stored in the memory 634 in corresponding memory locations 655, 656, 657. The RT arrangements produce output variables 661, which are stored in the memory 634 in corresponding memory locations 662, 663, 664. Intermediate variables 658 may be stored in memory locations 659, 660, 666 and 667.

Referring to the processor 605 of FIG. 6B, the registers 644, 645, 646, the arithmetic logic unit (ALU) 640, and the control unit 639 work together to perform sequences of micro-operations needed to perform "fetch, decode, and execute" cycles for every instruction in the instruction set making up the program 633. Each fetch, decode, and execute cycle comprises:

(a) a fetch operation, which fetches or reads an instruction 631 from a memory location 628, 629, 630;

(b) a decode operation in which the control unit 639 determines which instruction has been fetched; and (c) an execute operation in which the control unit 639 and/or the ALU 640 execute the instruction.

Thereafter, a further fetch, decode, and execute cycle for the next instruction may be executed. Similarly, a store cycle may be performed by which the control unit 639 stores or writes a value to a memory location 632.

Each step or sub-process in the processes of FIGS. 2, 3, 4, 8 and 9 is associated with one or more segments of the program 633 and is performed by the register section 644, 645, 647, the ALU 640, and the control unit 639 in the processor 605 working together to perform the fetch, decode, and execute cycles for every instruction in the instruction set for the noted segments of the program 633.

The RT method may alternatively be implemented in dedicated hardware such as one or more gate arrays and/or integrated circuits performing the RT functions or sub functions. Such dedicated hardware may also include graphic processors, digital signal processors, or one or more microprocessors and associated memories. If gate arrays are used, the process flow charts in FIGS. 2, 3, 4, 8 and 9 are converted to Hardware Description Language (HDL) form. This HDL description is converted to a device level netlist which is used by a Place and Route (P&R) tool to produce a file which is downloaded to the gate array to program it with the design specified in the HDL description.

The RT arrangements are used in the test phase, and typically run on a dedicated RDBMS platform such as 600 (see FIG. 6A). The RT arrangements typically encompass activities spanned by the "scope" arrow 118 in FIG. 1A, which encompasses all NMS's in the data warehouse, plus all the software which puts the data into these NMSs, plus all the tests which run against them. From another perspective the RT arrangements include the flexing and testing processes during the test phase as will be described with reference to FIG. 9 for example.

The RT arrangements operate in the region depicted by the arrow 118 that extends from after the data is loaded from the 101-105 sources, up to and including the point where treated data, i.e., data that has been operated on by the warehouse software, is received by specialised Business Intelligence (BI) solutions such as cubes 133, reports 135, 137, 139 and dashboards 141, 142 (also referred to as "information products").

The RT arrangements may be regarded as being "end-to-end" because:
  Data warehouse "load" processes (eg using the software modules 1005 and 1012 in FIG. 10, represented as 143 and 146 in FIG. 1A) may in some instances make some small changes to data when they first load it from the sources 1001, 1003 into the "data warehouse" database 1031. However, data changes done at this point are not in the scope of the RT arrangements. The RT starting point is the data after 143 and 146 have finished with it.
  Reports, analytics, cubes and dashboards, ie the entities at 152 that receive the data that has been operated upon by the warehouse software, shouldn't change the data downstream (i.e., in a direction 151) of the data marts and Business Area Data Warehouses (BADWH). They can however add derived measures such as sums or aggregations to the data with no risk. But if they make further changes to the data which are not stored in NMSs, then they are out of scope and can't get tested by the RT arrangements.
  SQL is a "declarative" language (i.e., a 4GL or 4th generation language), which makes it extremely sensitive to changes in the contents of NMS's it uses. This is especially the case where more than one NMS is involved in an SQL statement (which is the normal case). A seemingly small change in the input data can have an enormous effect on the output data. This is not chaotic, because the results are driven by clear mathematical logic, but nevertheless it quickly becomes very difficult to comprehend and keep track of what is happening to the data.

This effect is compounded when there are chains of NMS's in the data flows (which is the normal case). Often the data flows multiplex, branch out, double back on themselves, merge in again, and contain loops. Data lineage (in other words, "what went where") is therefore very difficult to keep track of. Warehouse software uses data or SQL statements as input so it is vulnerable to unintended "side effects", where a change to a piece of logic in one warehouse software module, such as 1010 in FIG. 10 for example, for one specific purpose, has a potentially dramatic and completely unexpected effect on the behaviour of the warehouse software, in some other, seemingly unrelated place, such as 1014 in FIG. 10 for example, In order to actually move data through the data warehouse system 1031 (see FIG. 10) it is necessary to run (or "flex") the warehouse software modules, which causes the data to flow between the NMSs.

This is done by running the tasks in some logical order which is defined and set up carefully by the system developers to make sure the warehouse software works properly. This causes data to flow between the NMS's, and for this reason is often referred to as a "data flow". Some data flows can't be started until others have completed, or they won't work properly, for example task 1014 must not start until task 1010 has completed, because task 1014 uses data from NMS 1007 which is one of the inputs for task 1014.

This carefully set up ordered list of pre-requisites for modules is known as a software schedule (e.g., see 205 in FIGS. 2 and 6A). The individual modules within a schedule are known as tasks or "data flows". In some warehouse software a task populates just one NMS, and in other cases the relationship is not 1:1.

Practical timing and optimization considerations often mean that the schedule is very complex, with some data flows being allowed to run in parallel, and others having many pre-requisites that must be completed before the data flows are allowed to start.

One of the peculiarities of working with data and with SQL is that there are a very large number of possible combinations of data. It is the unusual combinations and the "outliers" which tend to expose fragilities in the warehouse software and cause it to break or misbehave. For example, nothing much can go wrong if your data warehouse contains only one customer, called Mr Smith. But if there are 1000 customers there will probably be at least two Mr Smiths, and if there are 10,000 there will probably be two Mr Smiths who both happen to live on "Main Street", and need to be correctly differentiated.

For large (e.g., a one-gigabyte databases) the possible combinations of database configuration and SQL statements to be executed is enormous. It is thus impractical to expect to be able to test data warehouse software on every possible combination of inputs.

Following this logic, if one tests a data warehouse by just putting in one Mr Smith on his own, the testing will be finished pretty quickly, but it is very likely that enormous swathes of functionality and potential problems are not going to be exposed. In particular some of the esoteric, technical, intermediary NMSs may not even have any data going through them at all.

So, as a best compromise, part of the RT method uses a large, representative set of test data (see 201 in FIGS. 2 and 6A) with which to populate the NMSs in the warehouse for the RT processes. Having a large amount of data is not essential, and there are no formal specific requirements in terms of volume, content or quality of the test data. However the RT arrangements work best with a large, representative test data set.

Warehouse software testing is performed in order to ensure the quality of the warehouse software, and to establish its fitness for its intended purpose.

Regression testing is testing that is performed after changes have been made to part of an existing body of warehouse software, to ensure that the changes have not caused any detrimental or unexpected side effects on the correct functioning of the warehouse software as a whole.

Software development of data warehouse systems typically occurs in one of two general frameworks:
1. the "classic" or "waterfall" model, where big changes are made over long timescales (months or years), using a single long testing phase each time, and a single, big warehouse software delivery.
2. the "agile" or Extreme Programming "XP" model, characterized in contrast by delivering frequent (in the time scale of weeks) small increments in functionality. A testing phase is performed as part of every single delivery. In fact, as noted above each small increment in functionality ideally means that the warehouse software is subjected to a complete cycle including a development phase, a test phase, and then only if the test phase is successful, an operational phase.

Every time warehouse software is changed it should ideally be fully regression tested to make sure that new bugs haven't been introduced alongside new functionality.

Where regression testing takes place in an agile warehouse software development environment, the regression testing is known as "Continuous Integration Testing" or "CIT".

In the agile model there are frequent warehouse software deliveries. The disclosed RT approach is intended to assist in improving and automating the CIT for data warehousing software, and so is an "enabler" for good quality agile development of data warehouses. However, the RT arrangements can also be used in waterfall projects.

NMS's such as 1020 in the data warehouse system 1031 are populated by the warehouse software such as 1014. Some development tools or methodologies involve creating one warehouse software entity per NMS, and the job of that warehouse software entity is to populate its target NMS by acquiring data from wherever the developer specifies (such as NMS's 1007 and 1008), using whatever arbitrarily complex mechanism is needed.

Of course there may not necessarily be a 1:1 relationship between a target NMS and a warehouse software entity. An NMS can be populated by more than one warehouse software module, and one warehouse software module can populate more than one NMS.

The RT method can, in one example, include two types of tests, referred to in this specification as "unit tests" and "user acceptance tests". The distinction between the two types of test is not a feature of the RT arrangements, and is merely a guide to the origin of the test, how the tests are typically created, and why both types are important. The two types of test have attributes as follows:
  User tests (also referred to as "acceptance" tests, or User Acceptance Testing "UAT" tests) are focused on the business, and typically come directly from business analysts or subject matter experts (SME's) who participate in constructing the data warehouse system 100;
  Unit tests are technical in nature and typically come from the warehouse software and infrastructure developers.

However a technical SME may develop or specify technical tests and a good warehouse developer will often be able to infer or create business tests.

To further clarify the distinction between user tests and unit tests with an example, consider a restaurant. The main User Acceptance Test is:
  Does the food taste good?
  In order to back this up there will be many Unit (technical) Tests such as:
  Is the kitchen clean?
  Are the ingredients fresh?
  Is the chef sober?
  Is the pan hot?
  Specific attributes of the RT arrangements are:
  All the tests must always complete successfully; and
  All the tests are always needed (the kitchen may be clean, the ingredients fresh, the chef sober and the pan hot, but the food may still taste bad—all the tests are always needed, regardless of their origin).
  All the tests are equally important (a dirty kitchen may result in bad tasting food).

In other words, performing all the unit tests is not considered a substitute for performing the user acceptance tests. In data warehouse testing, unit tests prove that data can flow through the system, whereas user acceptance tests prove that the system does something useful.

"Test driven" development assists development in an agile project. The general principle is that firstly a test is written (e.g., the test no. 1 1030 in FIG. 10), and then associated code for the warehouse software module(s) are written (e.g., the warehouse software modules 1010 and 1014). Before the code is written and the software is flexed, the test is expected to fail. After the code is written the test should pass. To clarify, the business user submits a request, for example "I want the data warehouse to tell me how many potatoes we sold last year". The developer writes a test to the effect that "verify that the data warehouse can correctly tell me the number of potatoes sold last year". It is expected that this test will fail because the data warehouse does not currently contain the desired functionality, and the appropriate software hasn't been written yet. After successful development of the software, the new test (and all the other existing tests) must pass. This actually defines "successful development" in RT.

All previously-written tests must also pass, and in an agile environment this is the purpose of CIT.

Hypothetically, CIT could adopt a simplified approach of flexing all the software and then running all the tests for all the NMSs, every time even the smallest change is made to software.

However, running all the tests in a data warehouse system such as 1031 is thus likely to be prohibitively time consuming. The RT arrangements adopt the approach of running only those tests which are necessary to fully test a change. In order to do so, it is necessary to:
  Identify that subset of tests, by navigating the complex data lineage; and
  Flex the required subset of the warehouse software, given the side effects and hysteresis The RT arrangements provide a novel, practical method for performing Continuous Integration Testing of data warehouse software in an automated way.

CIT is a standard part of agile, test driven development. Some data warehouse projects don't use agile test driven development, however the RT arrangements can nonetheless be used in such environments. The only difference is that the process 900 will probably be performed less frequently, because in a non-agile project testing is usually performed as a single large step late in the project timeline.

The RT arrangements fully flex and test updated warehouse software, and effectively perform a full user acceptance test every time the RT arrangements are invoked, no matter how minor the change to the warehouse software.

The RT arrangements verify that the new warehouse software passes all the tests, even given the following constraints:
 there generally is not sufficient time to run all the tests or even all the warehouse software;
 potentially the test data (see 201 in FIG. 2A) has changed since the tests were written; and
 there is no 1:1 link between a piece of warehouse software and a test The RT arrangements run on the test platform (see 600 in FIG. 6A) which incorporates the following:
 (a) the test data 201 which is loaded into the data warehouse 1031 to form the NMSs such as 1006, the warehouse 1031 also including the warehouse software modules such as 1014;
 (b) the software schedule 205 used to flex the warehouse software; and
 (c) the library (repository) of tests 203.

Warehouse software such as 1014 is typically not developed in the environment in which it gets executed. There are many reasons for this, the main one being that during development the warehouse software spends much of its time broken and unusable.

As described above, data warehouse development ideally uses the three following environments:
 Development (using the test platform);
 Test (CIT) (this is where a system implementing a RT arrangement runs) using the test platform; and
 Live (using the operational platform).

Warehouse software developers create the warehouse software in the development environment. Usually the warehouse software developers work in isolation from one another. Periodically a batch of software changes are promoted (ported) into the test environment (usually from multiple developers), after which the warehouse software as a whole is flexed and tested. When some agreed functionality is ready and has been successfully tested, the warehouse software is promoted from the Test environment into the Live environment (i.e., the operational environment), and is then available for real use.

In an agile data warehouse environment the promotion from the development environment to the test environment may happen multiple times per-day, and from the test environment to the Live (operational) environment every few weeks. In a waterfall environment the timescales are usually months.

Figure 2A:
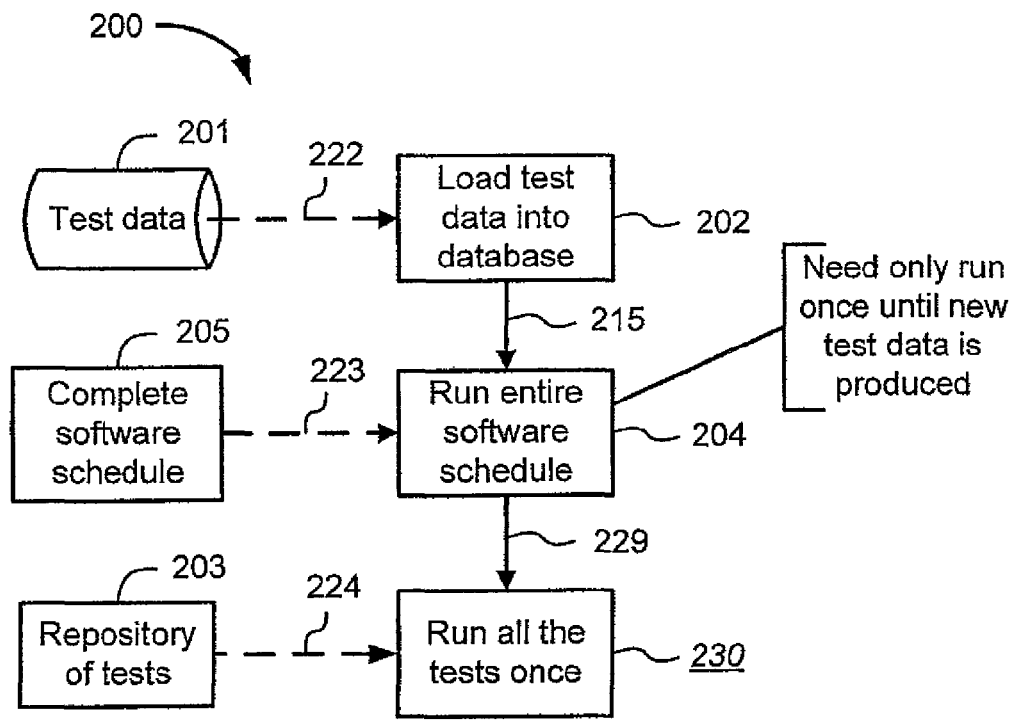

FIGS. 2A and 2B are flow diagram fragments depicting an example of a process 200 for flexing the warehouse software in a data warehouse according to one RT arrangement.

The process 200 has two segments, an initial segment which fully flexes the warehouse software using the complete software schedule and then fully tests the warehouse software using the complete set of tests 203, and a second, cyclical, segment, which partially flexes, and tests, the warehouse software whenever a change to the software is detected. All process steps are performed by the processor 605 under the control of the RT software 633 unless otherwise stated.

The first segment commences with a step 202 which loads, as depicted by a dashed arrow 222, the comprehensive test data set 201 into the NMSs such as 1008 of the warehouse 1031. The process segment then follows an arrow 215 to a step 204 which flexes the warehouse software (e.g., 1014) by executing all the warehouse software modules in the complete software schedule 205. The process segment then follows an arrow 229 to a step 230 which, as depicted by a dotted line 224, executes all the tests in a repository of tests 203 in order to test the flexed warehouse software before any changes are made thereto, these changes being detected by a step 206 as described below.

The second segment, referred to as an RT test cycle, commences with the step 206 which listens for changes to any of the warehouse software to determine if any change has been made to the warehouse software. If this is not the case the segment follows a NO arrow 216 back to the step 206 in a looping manner. If however a software change is detected, the segment follows a YES arrow 217 to a step 207. The step 207 scans a "change record", described in more detail below, from the step 206 and identifies those NMSs affected by the change. This step outputs a list of names of the NMSs affected by the change. The segment then follows an arrow 218 to a step 208 which determines the downstream set of NMSs for each of the NMSs identified by the step 207. The step 208 determines the downstream set of NMSs and outputs a set of NMSs containing all the NMSs potentially affected by the software change. This is described in more detail with reference to FIG. 3.

The segment then follows an arrow 219 to a step 209 which determines which tasks populate which NMSs (i.e. which software modules cause data to flow into which NMSs). The step 209 thus determines the set of tasks, i.e. the software modules, which populate the set of NMSs determined in the step 208. This effectively identifies (selects) which warehouse software modules are associated with the NMSs identified in the step 207, and the downstream NMSs identified by the step 208. Having identified the aforementioned software modules, the segment follows an arrow 220 to a step 210 which constructs a reduced software schedule. This reduced schedule contains only those warehouse software modules which are involved in the population of the NMSs which have been identified as being affected by the software change identified by the step 206. The step 210 is described in more detail with reference to FIG. 4.

The segment follows an arrow 221 to a step 211 which runs (executes) the tasks in the reduced schedule. This flexes only those warehouse software modules which are involved in the population of the NMSs which have been identified as being affected by the software change identified by the step 206.

The process segment then follows an arrow 225 to a step 212 which determines if any errors have occurred during the flexing of the reduced software schedule. It is possible that the reduced schedule fails to run to completion before testing even starts. The types of error that may occur at this point are "technical" errors, such as data being written to a field which is too small. Consider a concrete example using an Oracle database. If a software module attempts to transfer a string of characters (e.g., a person's surname) into an NMS (e.g., a database table), and the string is too long for that NMS (e.g., it exceeds the maximum permissible length of the "surname" column on that table) then the Oracle database raises an error condition (in this case numbered ORA-12899) which causes the execution of the software module to fail without successfully transferring the data into the NMS. In all RDBMSs there are many such comparable error conditions, all of which would prevent a software module from finishing successfully under certain circumstances.

If errors are detected, the segment follows a YES arrow 226 to a step 213 which declares the test cycle to be a failure. The software change detected by the step 206 is thus deemed to be flawed, and the flow of control is passed back to the software developers in the development environment so that they can correct the problem. If however no errors occur, then the segment follows a NO arrow 227 to a step 214. The step 214 is a null process step, and merely serves to indicate that the flexed data populating the warehouse is now ready for the next "test phase". The segment then follows an arrow 228 to a step 801 which is described with reference to FIG. 8.

Reviewing the process 200, it is noted that the RT arrangements automatically listens (see 206) for changes made to the warehouse software, and automatically start a test cycle when a change is detected. In an alternative embodiment this may be done manually.

The RT arrangements require that the repository of tests 203 be created and maintained. The repository 203 contains all the unit tests and acceptance tests that have ever been written. The repository starts off empty.

The test repository 203 is agnostic as to the source of the test (i.e., user or developer) and what purpose it fulfils (business or technical).

All tests in the present RT examples are written using SQL.

Tests are more thorough, and are therefore be better indicators of quality, when they are run against realistic, large sets of test data.

Tests can reflect technicalities and/or desired business functionality. The preferred development method is for the developers to discuss goals with a business representative or SMEs, and first establish the business goal. An example of a business goal could be "I want to know who visited my website yesterday", which the developer or SME translates into the test "the data warehouse must contain the information about who visited my website yesterday". This test must be expressed in one or more SQL statements (and it always can be) testing such things as "NMS X must contain all the records from NMS's A, B and C, without any duplicates or omissions".

The developers then determine how to write or alter the warehouse software code to fulfil the business requirement. While they are working they work out all the technicalities and write additional technical tests for all the steps along the way that the data passes through on its way to NMS X. There will usually be many technical tests for each business test.

Tests are accumulated in the repository 203. Tests are never removed from the repository unless the test they perform becomes invalid for a technical or business reason.

For the purpose of the RT arrangements, the SQL tests must be written in a specific way namely:

They must be independent of the test data

No "expected results" are ever recorded or used in comparisons (because they are specific to actual data)

A "pass" is represented by the SQL test returning zero records. Anything else (or a test execution error) is a failure. The developer of the test is free to use the power and flexibility of SQL in any way they see fit such that when the SQL query is executed it only returns zero rows if the test passes. Several different examples are now shown, each of which use a SQL query to test a technical or business aspect of the data in a set of hypothetical NMSs.

The SQL syntax shown is targeted at Oracle, but this is just by way of example, and the principles apply equally to any other RDBMS.

Query 1 tests the transformation of data from NMS3 into NMS6, for example as a technical test to verify that no records were lost or omitted during the software execution. An example SQL query is: SELECT key1 FROM nms3 MINUS SELECT key1 FROM nms6

Query 2 tests that the data warehouse software does not "lose" any records in transit between NMS3 and NMS10. An example SQL query is: SELECT 'fail' FROM dual WHERE (SELECT COUNT(*) FROM nms10)<(SELECT COUNT(*) FROM nms3)

Query 3 tests that the data warehouse software has correctly added a default row for a dimensional non-join (adding such a default row is standard practice in the industry). An example SQL query is: SELECT 'fail' FROM dual WHERE NOT EXISTS (SELECT 'x' FROM nms10 WHERE key=0 AND country='None')

Query 4 tests the contents of NMS4 against the contents of NMS1, in a conceptually similar way to Query 2, although this time using a hash function to test that the product names have been correctly transferred between the NMSs by the software. An example SQL query is: SELECT 'fail' FROM dual WHERE (SELECT SUM(DBMS_UTILITY.GET_HASH_VALUE(product_name,0,65536)) FROM nms1) !=(SELECT SUM (DBMS_UTILITY.GET_HASH_VALUE(product_name,0,65536)) FROM nms4)

Query 5 tests the contents of NMS5 against the contents of NMS2, in a more simplistic but conceptually similar way to Queries 2 and 5. An example SQL query is: SELECT 'fail' FROM dual WHERE ((SELECT COUNT(*) FROM nms2) !=(SELECT COUNT(*) FROM nms5))

Query 6 is a more complex, multi-purpose test, which verifies firstly that the software has correctly copied customer names between NMS1 and NMS2, and furthermore also verifies that (for today's newly loaded data) the financial amounts reconcile correctly between NMSs 1 and 2 jointly, and NMS11. An example SQL query is: SELECT 'fail' FROM dual WHERE EXISTS (SELECT nms1.cust_name FROM nms1 LEFT JOIN nms2 ON nms1.cust_name=nms2.cust_name WHERE nms2.cust_name IS NULL) OR (SELECT SUM (nms1.sales_amount) FROM nms1 NATURAL JOIN nms2)< >(SELECT total_sales FROM nms11 WHERE load_date=TRUNC(SYSDATE))

The RT arrangements require that the test data 201 be loaded (see 202 in FIG. 2A) into the database 1031 in the test environment 600. There is no requirement on how this is done, just a recommendation that the test data 201 be representative of the real data which is present in the live environment. Of course real data from the live environment can be used, subject to information security requirements.

The test data 201 is loaded into the warehouse 1031 once on the platform 600. This corresponds to the arrows (1004, 1011) in FIG. 10.

Having loaded all the test data, the RT method then requires that the entire schedule 205 be run once. This is to populate all the NMSs in the warehouse 1031 with data.

The RT method preferably runs all the tests in the repository 203 at this point, to check if any previously unknown or unexpected combinations of input data have immediately exposed bugs in the existing system. If bugs are detected straight away even before the warehouse software has been changed, they will be much more difficult to fix when warehouse software changes are introduced as well.

The one-off load, execution and full test (i.e., the steps 202, 204 in FIG. 2A) is a relatively big exercise. This only ever needs to be repeated if a new, better or more representative set of test data 201 becomes available. However the load, execution and full test can be repeated whenever those responsible for testing see fit.

The method of the RT arrangements then requires the implementing system to "listen", in a step 203 in FIG. 2A, for changes made to the warehouse software in the test environment.

This listening process can be performed in various ways, because software changes can be promoted from development in numerous different ways. RT systems implementing the method are free to "listen" in whatever way is appropriate. (The working implementation includes a listener mechanism which is specific to one data warehouse development tool, which performs the "listening" by periodically checking the contents of an NMS in the database which is known to contain metadata about software promotions.

The goal is for the listener to establish the list of names (referred to as a "change record") of the NMS's which have been directly affected by the warehouse software changes.

The RT method then scans, in a step 207, the "change record" from the listener and finds the list of NMS's which have been affected by the change.

This is done by scanning the source code of the changed warehouse software entities (these being the software modules to which the change has been effected) for the names of NMS's. If the name of an NMS appears in the source code that has been changed, then the NMS is assumed to have been affected and needs to be re-tested. Any number of warehouse software modules may have been changed, and there need be no relationship between the changes. (For example a change record may comprise code changes for multiple unrelated bug fixes. Alternatively a change record may contain code changes for a single business enhancement).

The output of this stage is a list of the names of NMS's.

At this point we have a list of NMS's which have been directly impacted by changes to the data warehouse software. Specifically this means that the new warehouse software may start to populate those NMS's differently, and they may contain different data than before. So these NMS's definitely need to be tested.

But that list is far from complete. Side effects (as described in the "background" section) mean that changes to these NMS's can potentially affect the contents of other NMS's indirectly, by causing the software which makes data flow into them to behave differently when flexed.

So the next step is to find all the NMS's which could be affected indirectly by the change, i.e., the set of NMSs which are "downstream" in the data lineage.

Noting that there may be all sorts of branches and loops in the data flows, including flows which form infinite loops by circling back upon themselves, the RT arrangements specify the following steps for each NMS to establish its "downstream tree".

Figure 3:
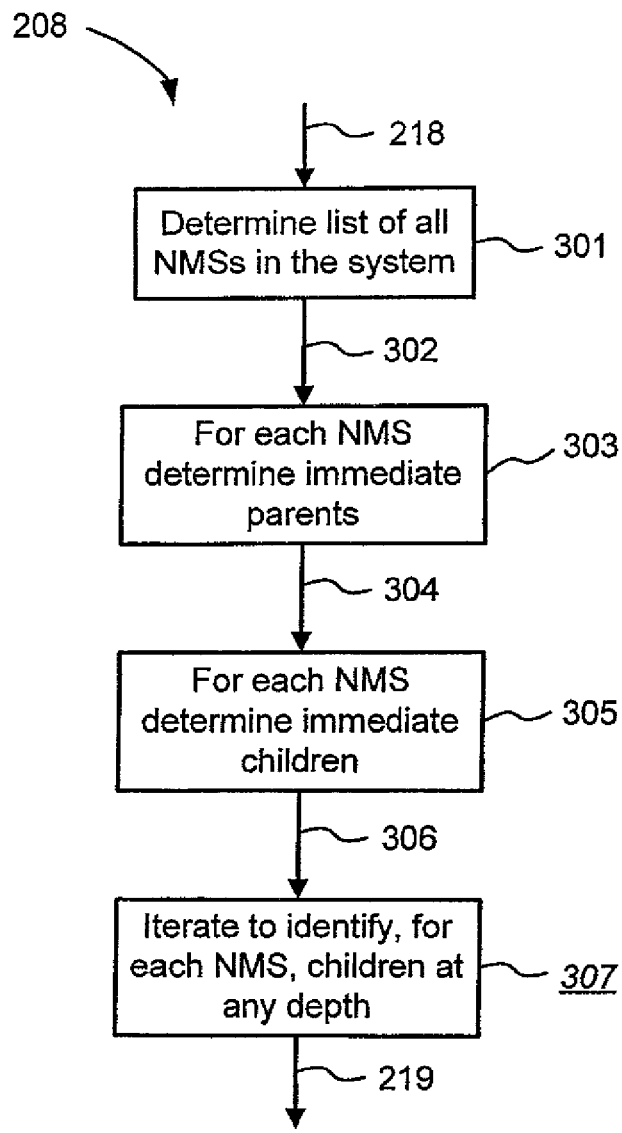
FIG. 3 is a flow diagram showing determination of downstream Named Materialised States (NMSs) in the process fragments of FIGS. 2A and 2B.

FIG. 3 is a flow diagram showing a process 208 for determination of downstream Named Materialised States (NMSs) in the process fragments of FIGS. 2A and 2B.

All process steps are performed by the processor 605 under the control of the RT software 633 unless otherwise stated. The process 208 commences with a step 301 which determines a list of the names of all NMSs in the warehouse 1031. The process 208 then follows an arrow 302 to a step 303 which determines, for each NMS identified in the step 301, the immediate parent NMSs of the NMS. A "parent" NMS in this sense is any NMS which could directly contribute in any way to the data which flows into an NMS. The process 208 then follows an arrow 304 to a step 305 which determines, for each NMS identified by the step 303, the immediate children NMSs by inverting the previous logic of step 303.

The process 208 then follows an arrow 306 to a step 307 which iterates to identify, for each NMS, children at any depth.

In other words, the process 208 involves the following steps:

1. Acquire (see 301) a list of the names of all the NMS's in the warehouse system 1031. This is taken from metadata provided either by the system catalog or data dictionary of the warehouse 1031, or by a software development tool if in use.

2. For every NMS, find (see 303) the list of NMS's which comprise its immediate parents, i.e., those NMS's which feed data directly into it. This list is acquired by scanning the source code of the software which materializes the NMS, and searching the text for the names of any known NMS. Again this can be done, for example, either by viewing the system catalog or data dictionary of the warehouse 1031, or by viewing metadata captured by a software development tool (if one is in use).

3. Invert the above logic to create (see 305), for every NMS, the complete list of NMS's which comprise its immediate children in the data lineage hierarchy.

4. For every NMS, iterate (see 307) downstream in the data lineage hierarchy to create the list of NMSs which comprise its children at any depth. To avoid an infinite loop the method is to recursively add to a variable length list of NMS's those NMS's which are children of children, at any depth; repeating the recursive addition until the list does not increase in length.

From these first four steps 301, 303, 305 and 307, the RT method has now constructed, for every NMS, the set of other NMS's which are "downstream" at any depth in the sense that their materialization requires some data from the NMS.

Various shortcuts can be employed in this calculation, for example caching parts of the lineage so only the changes have to be re-queried.

This part of the method finishes by establishing the set of all NMS's which could possibly have been affected by the warehouse software changes. This is just determined as the union of all the downstream NMSs of all the directly-affected NMS's.

In this way the method establishes a complete list of all the NMS's which need to be re-tested because they have potentially been affected in some way by the software change.

At this point, returning to the arrow 219 in FIG. 2B, we have a list of NMS's which have been directly or indirectly impacted by changes to the data warehouse software.

In order to test these NMS's, it is necessary to first execute the warehouse software which populates them with data, and then run the tests.

Of course given the impact of side effects, it's not possible to just run warehouse software entities one by one in some random order, and then run the tests. It is necessary to adhere to the schedule which the developers have set up, which defines the required execution order and task pre-requisites. But with the recommended large data volumes, it may take considerable time to run an entire schedule, which is very likely to cause delays in a fast moving agile CIT environment.

To get around this, the principle underpinning this part of this RT arrangements is not to re-run parts of the warehouse software which have not been affected by the change. It is noted that this is not an "efficiency", but rather it is a necessity.

Figure 4:
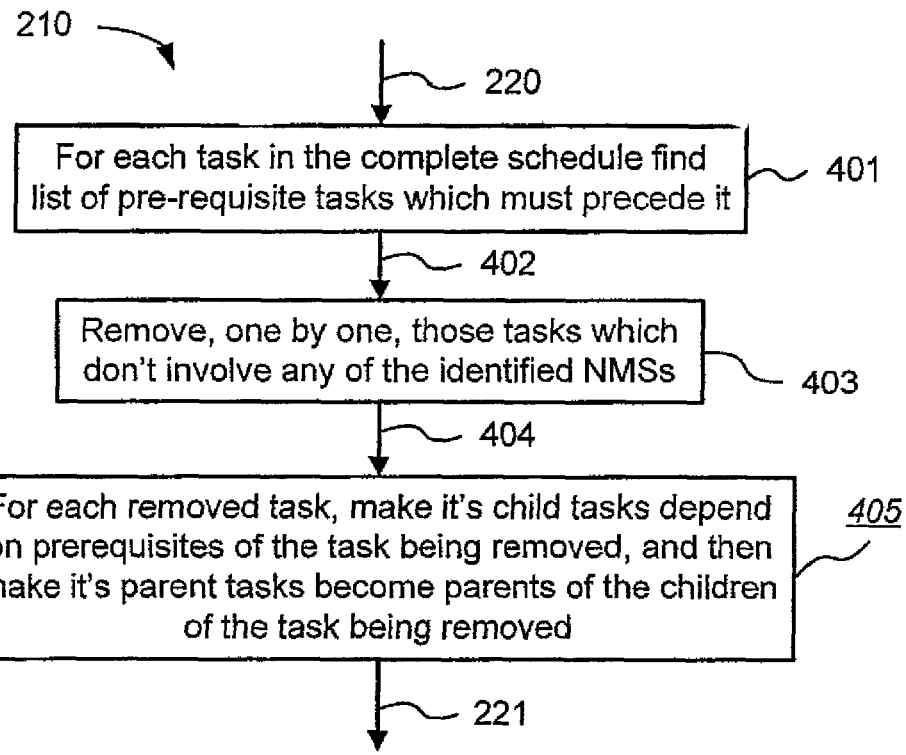
FIG. 4 is a flow diagram showing determination of a reduced test schedule in the process fragments of FIGS. 2A and 2B.

FIG. 4 is a flow diagram showing a process 210 for determination of a reduced test schedule in the process of FIG. 4. The information input to the process 210 is the set of NMSs which have potentially been affected by the software changes, as derived in the step 208 in FIG. 2B.

All process steps are performed by the processor 605 under the control of the RT software 633 unless otherwise stated.

The process 210 commences with a step 401 which, for each task (i.e., warehouse software module) in the complete schedule 205, finds the list of pre-requisite tasks which must precede the task in the desired order of execution. The process then follows an arrow 402 to a step 403 which removes, one by one, those tasks which don't involve any of the NMSs identified in the step 208 in FIG. 2B.

The process then follows an arrow 404 to a step 405 which, for each task removed by the step 403, makes the children of that (removed) task depend upon the pre-requisite tasks of the task being removed, and then makes those pre-requisite tasks the parents (i.e., pre-requisites) of the children of the task being removed.

Looking at FIG. 4 from another perspective, the reduced schedule of software is constructed by starting with the original schedule of software 205, and removing all the NMS's which aren't needed, while always adhering to the original prerequisites. This takes advantage of the fact that NMS's contain materialized data and there's no need to re-populate them if the warehouse software is unchanged, because the data from an earlier run will still be present. In other words, there is no need to repopulate NMS's which could not have been affected by the change.

The first step is to acquire the information about which tasks populate which NMS's, and this is shown as the step 209 in FIG. 2B. This can be either obtained by scanning the source code of the task modules held in the database, or by querying metadata from a software development tool if one is in use.

The RT arrangements specify the following steps to arrive at the required cut-down schedule.

1. at step 401 in FIG. 4—begin with a copy of the original schedule 205, containing all the tasks (is warehouse software modules) in the warehouse system 1031. For each task, find the associated list of zero or more pre-requisite tasks which must precede it;

2. at step 402 in FIG. 4—remove one by one those tasks which are not to be included in the cut-down schedule because they don't involve any of the impacted NMS's;

3. at step 403 in FIG. 4—for each task removed, first make its child tasks (if any) depend on the prerequisites (if any) of the task being removed. Second, make its parent tasks (if any) become parents of the children (if any) of the task being removed.

To run the cut-down schedule the tasks must be run (see 211 in FIG. 2B). The RT arrangements require that (1) only the tasks in the reduced schedule are executed and (2) the original task ordering and pre-requisites are adhered to during execution. The RT arrangements do not have any specific requirement on how the execution of the software modules is actually done—because there are many ways of doing this. Two possible arrangements are preferred:

1. The RT software itself launches the tasks in the reduced schedule; or

2. If a software development tool is being used to develop the warehouse software (as mentioned in steps 208 and 209), use that software development tool to launch the tasks in the reduced schedule FIG. 5 is a flow diagram of the process 211 showing execution of tasks in the reduced test schedule in the process fragments of FIGS. 2A and 2B.

All process steps are performed by the processor 605 under the control of the RT software 633 unless otherwise stated. The process 211 commences with a step 501 which launches all remaining tasks (warehouse software modules) which have no unsatisfied pre-requisites. The process 211 the follows an arrow 502 to a step 503 which, once the step 501 is completed, flags the completed tasks as completed. The process 211 follows an arrow 504 to a step 506, which tests if all tasks in the reduced schedule have been completed. If this is not the case, the process 211 follows a NO arrow 505 back to the step 501. If on the other hand, the step indicates that all tasks have been completed, then the process 511 follows a YES arrow 220 to the step 212 in FIG. 2B.

Figure 5:
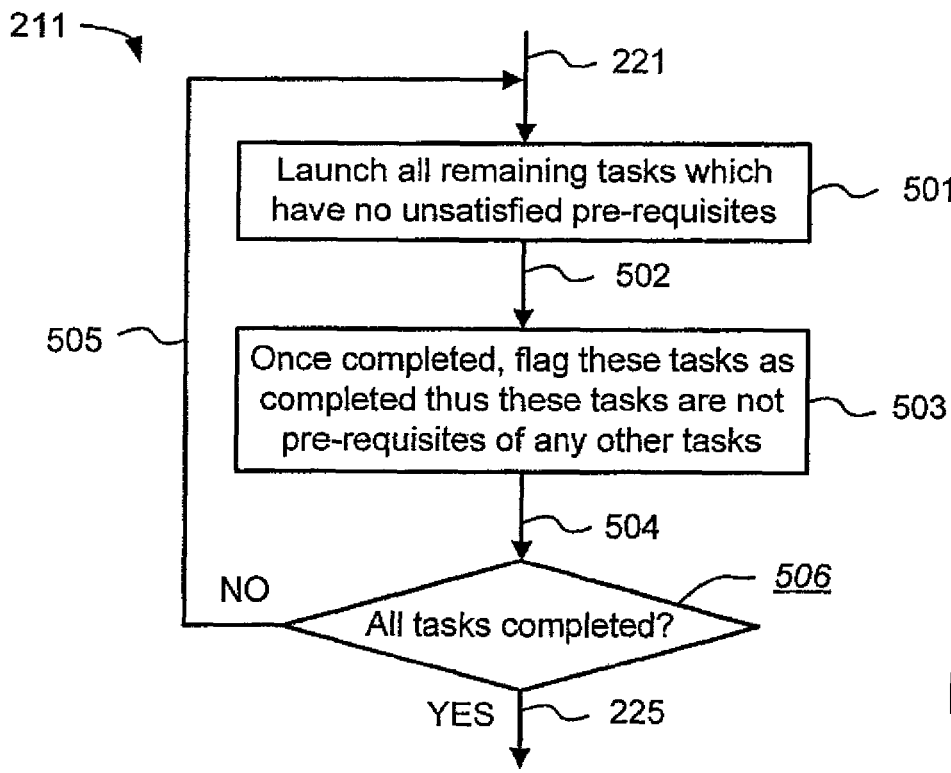
FIG. 5 is a flow diagram showing execution of tasks in the reduced test schedule in the process fragments of FIGS. 2A and 2B.

Looking at FIG. 5 from another perspective, the following steps are needed.

1. Launch (see 501 in FIG. 5) all the tasks which have no unsatisfied pre-requisites, and wait for their completion. Once completed, if this task is a pre-requisite for one or more other tasks then that pre-requisite is marked as "satisfied" in terms of the dependent task. The dependent task becomes available for execution itself, once all its pre-requisite tasks have been executed.

2. Repeat (see 503 in FIG. 5) the previous step until all the tasks in the reduced schedule have finished execution.

Returning to the step 212 in FIG. 2B, if any errors occur then the execution of the process 200 is immediately abandoned, and the test is deemed a failure without the need to even run any tests. This condition indicates that the warehouse software under test cannot handle some combination found in the test data 201, and is therefore certainly unfit for purpose.

The situation may also arise where it is not possible to run any more of the outstanding tasks in the reduced schedule of software. This would indicate that the original schedule 205 specified a circular dependency, and is also an immediate error condition.

Under normal circumstances the reduced schedule runs to completion and the RT arrangements proceeds to the next stage at the step 214.

At this point we have run the warehouse software to completion, and have a set of data in the NMS's which can now be tested.

Figure 8:
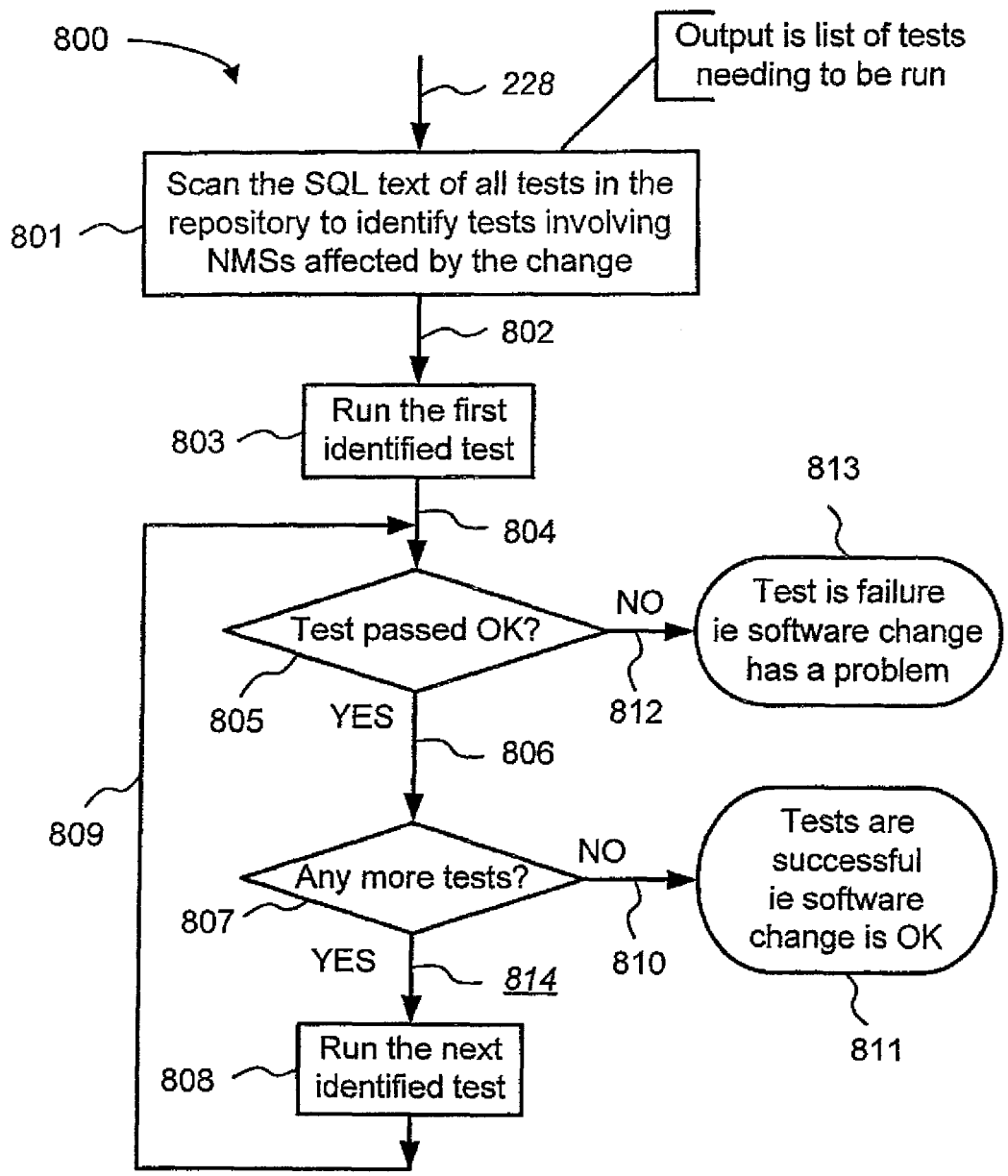
FIG. 8 is a flow diagram depicting an example of a process for testing the warehouse software using the tests and the reduced test schedule constructed by the RT arrangement.

FIG. 8 is a flow diagram depicting an example of a process 800 for testing the warehouse software using the tests and the reduced test schedule constructed by the RT arrangement. The process 800 follows on from the step 214 in FIG. 2B.

All process steps are performed by the processor 605 under the control of the RT software 633 unless otherwise stated. The process 800 commences with a step 801 which scans the SQL text of all the tests in the repository 203, to identify those tests which involve NMSs identified by the steps 207 and 208 as being affected by the software change detected by the step 206.

The process 800 then follows an arrow 802 to a step 803 which runs the first test identified by the step 801. The process 800 then follows an arrow 804 to a step 805 that determines if the test in question was successful. If this is true, the process 800 follows a YES arrow 806 to a step 807 that determines if any further tests remain. If this is not true, the process 800 follows a NO arrow 810 to a step 811 which declares that all tests have been successful, the software change or changes are OK and the test cycle has been successful.

If the step 807 indicates that there are further tests to be run, then the process 800 follows a YES arrow 814 to a step 808 that runs the next identified test. There is no order associated with the test that is run in this step, noting only that all the tests identified in the step 801 must be run at some point in the test cycle. The process 800 then follows an arrow 809 back to the testing step 805.

Returning to the step 805, if the step determines that the test in question has failed, then the process 800 follows a NO arrow 812 to a step 813 which declares that all tests have not been successful. This means that the software change(s) are not OK, indicating that the test cycle is a failure, and that the warehouse software is to be returned to the development environment. If the test cycle is a failure, this means that the software change(s) have caused at least one problem.

It is noted that the RT arrangements can check multiple unrelated changes at the same time. A key principle underpinning this part of this RT arrangements is not to re-run any test that could not possibly fail due to a change to warehouse software made since the last time it was run.

Note again that this is not an "efficiency" measure, but rather it's a necessity of the RT approach, namely that tests are run if they need to be, and otherwise they are skipped. The tests may be executed in any order, or in random order, and no one test is deemed to be more important than any other.

In detail, the method is to scan (see 801 in FIG. 8) the SQL text of every single test in the repository one at a time, and for each test see if the SQL text involves any of the NMS's which have been directly or indirectly impacted by the changes to the data warehouse software (as identified by the steps 207 and 208).

Any test that does not involve any of these NMS's can safely be skipped. Any test that does involve any of these NMS's must be run.

The method does not seek to minimise the number of tests that need to be run. There is no element of choice in the method, and all tests that are applicable are run (see 803 in FIG. 8). Correspondingly, all tests that are not applicable in any way are not run.

The method for actually running the tests in the repository 203 is, one at a time, to take the text of the SQL query from the repository and construct a piece of dynamic SQL which does a "SELECT COUNT(*) FROM (<<SQL Text>>)"

This SQL construct is syntactically legal in all major RDBMS implementations, and makes the test independent of the data and simple to perform (although not necessarily quick to perform). If the returned count is zero, the test passes. If the returned count is non-zero, or if the SQL statement itself fails, then the test fails.

If all the tests that were run pass, then the CIT is finished and deemed a success (see 811 in FIG. 8). Similarly, if any tests fail then the CIT is deemed a failure (see 813 in FIG. 8).

One implemented RT arrangement implements a mechanism for showing what's happening in a multi-user environment. More particularly, a physical traffic light indicator displayed on the display 614 in FIG. 6A turns green when all is well (indicating the step 809 in FIG. 8), yellow when running (i.e., when the process 200 or 800 are executing), and red on failure (indicating the step 808 in FIG. 8). This is suitable for development teams which are physically co-located.

The aforementioned RT implementation also includes a simple web server which displays the same "traffic light" information by means of an intranet web site. This is suitable for development teams which are not physically co-located.

Figure 9:
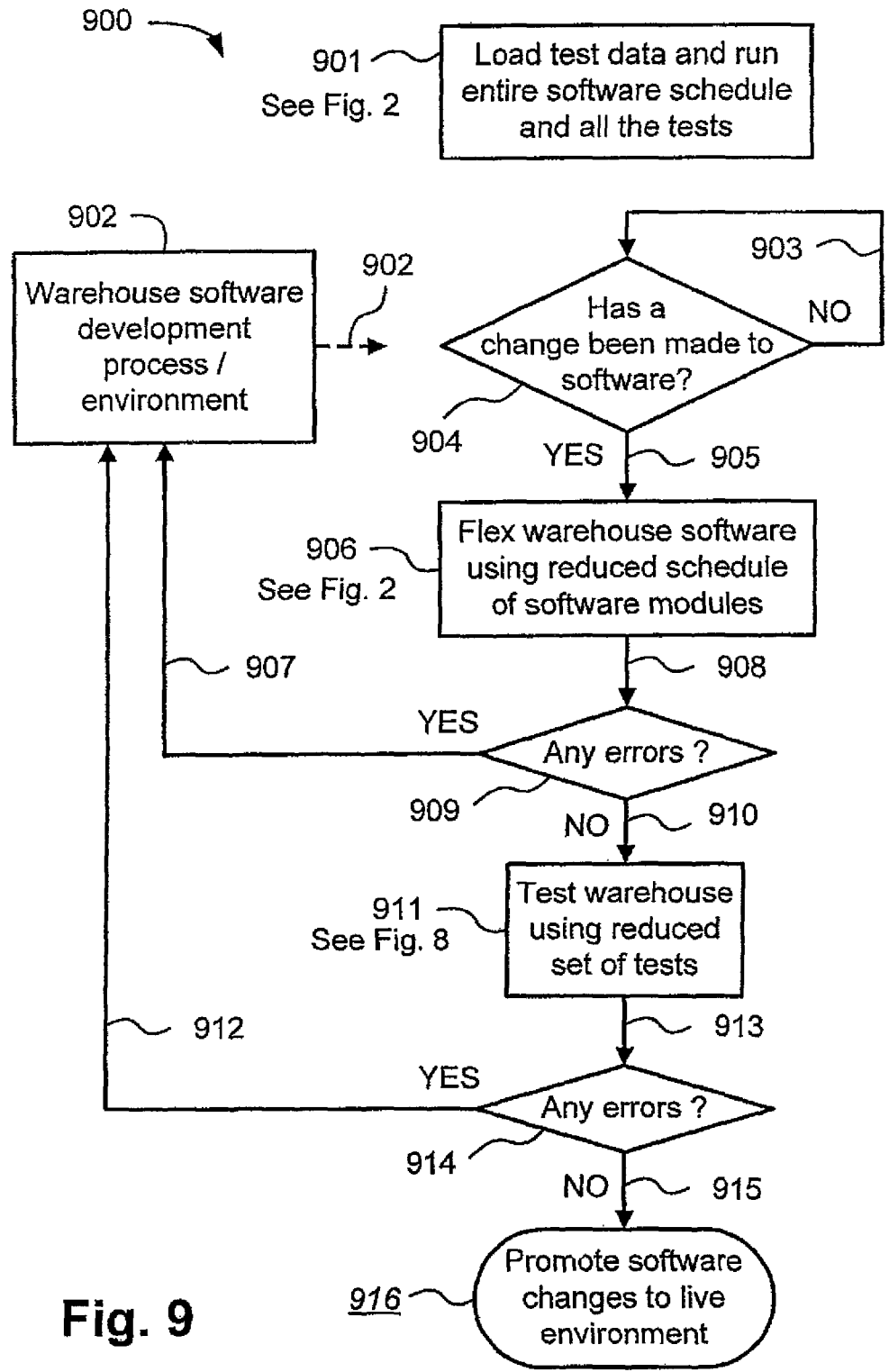
FIG. 9 is a flow diagram depicting an example of an RT process.

FIG. 9 is a flow diagram depicting an example of an RT process 900.

All process steps are performed by the processor 605 under the control of the RT software 633 unless otherwise stated. The process 900 commences with a step 901 which loads the test data 201 into the data warehouse 1031 running in the test environment 600 and runs the entire software schedule 205. The step 901 also runs all the tests once to make sure they all pass to begin with.

A step 904 "listens" and determines if any change has been made to the warehouse software. If this is not the case then the process 900 follows a NO arrow 903 back to the step 904. If on the other hand a change is detected, then the process 900 follows a YES arrow 905 to a step 906 which flexes the warehouse software using a reduced schedule of software modules. The process 900 then follows an arrow 908 to a step 909 which determines if any flexing errors have occurred. If this is the case the process 900 then follows a YES arrow 907 and the software is handed back to the software developers in the development environment. If on the other hand the step 909 does not detect any errors, then the process 900 follows a NO arrow 910 to a step 911 which tests the software changes in the warehouse using a reduced set of tests.

The process 900 then follows an arrow 913 to a step 914 which determines if any testing errors have occurred. If this is the case the process 900 then follows a YES arrow 912 and the software is handed back to the software developers in the development environment. If on the other hand the step 914 does not detect any errors, then the process 900 follows a NO arrow 915 to a step 916 which promotes the software to the production environment for live use. The step 916 is optional in that implementors could choose to perform the process 900 multiple times, and then only once promote all the changed software to the Production environment for live use.

In summary, the RT arrangements run all the relevant Tasks and all the relevant tests, the term "relevant" indicating those transforms and tests which are affected by the particular warehouse software change that has been implemented.

Key advantages of the RT arrangements include;
There is no need to flex all the software modules during regression testing;
There is no need to run all the tests during regression testing;
There is no need to calculate or maintain "expected results" for tests;
Complex lineage capture is captured automatically;
Reliance is placed on data materialization from earlier software executions
There is no decision-making or intelligent prioritization to make the testing more efficient. The RT arrangement simply does the minimum that is necessary
There is no distinction between types of test (unit, user acceptance etc) meaning that in effect a full User Acceptance Test is performed every time the RT arrangement is used;
Because the crucial aspect of warehouse software is data, RT arrangements record no direct link between any individual test and any individual component of the warehouse software. Instead, the relationship is instead held indirectly: both warehouse software and tests being linked to the NMSs which underpin the system; and
The concept of testing is separated from the execution (flexing) of the warehouse software under test;

INDUSTRIAL APPLICABILITY

The arrangements described are applicable to the computer and data processing industries and particularly for the data warehouse industries.

The foregoing describes only some embodiments of the present invention, and modifications and/or changes can be made thereto without departing from the scope and spirit of the invention, the embodiments being illustrative and not restrictive.

Although the present invention has been described with reference to preferred embodiments, workers skilled in the art will recognize that changes may be made in form and detail without departing from the spirit and scope of the invention.

The invention claimed is:

1. A method of qualifying a change to one or more software modules in a plurality of software modules in a data warehouse, said data warehouse comprising a database storing a plurality of data sets and said plurality of warehouse software modules, wherein prior to effecting the change to the one or more software modules, test data has been loaded into the data warehouse, a complete schedule of the plurality of software modules has been executed to populate the data sets from the loaded test data, and a complete set of warehouse tests has been run, and found to pass, in regard to the populated data sets, the method comprising the steps of:
  determining if a change has been made to any of the plurality of software modules;
  selecting from the plurality of software modules the software modules which are affiliated with the change to thereby construct a reduced schedule of software modules;
identifying from the complete set of warehouse tests the tests which are affiliated with the change to thereby identify a reduced set of tests;
  executing the reduced schedule of warehouse software whilst continuing to respect an order of the software modules in the complete schedule;
  running the reduced set of tests; and
  if no warehouse software execution errors arise from execution of the reduced schedule of warehouse software, and no warehouse test execution errors or failures arise from execution of the reduced set of tests, qualifying the change to the one or more software modules as a success, or otherwise as a failure; wherein the step of determining if a change has been made comprises periodically checking contents of a data set in the database, said data set containing metadata about software promotion of a change software module.

2. A method according to claim 1, wherein the step of constructing the reduced schedule of software modules comprises one or more of scanning source code of the software modules held in the database, and querying metadata from a software development tool if one is in use in effecting the change to thereby construct the reduced schedule of software modules.

3. A method according to claim 1, wherein the step of constructing the reduced schedule of software modules comprises the steps of:
  (a) scanning source code of the changed software modules to identify names of data sets;
  (b) determining, for each data set identified in the changed software modules, names of immediate parent data sets;
  (c) determining, for each data set identified in the changed software modules, names of children at any depth;
  (d) determine, for the data sets identified in the steps (a)-(c), software modules that populate the identified data sets;
  (e) determining, for each software module in the plurality of software modules, a list of parent software modules which must precede said each software module in a desired order of execution;
  (f) removing software modules that do not involve data sets identified in the steps (a)-(c);
  (g) for each software module removed by the step (f), making the children of the removed software module depend upon the parent software modules of the software module being removed; and making those parent software modules the parents of the children of the software module being removed.

4. A method according to claim 3, wherein the step of identifying from the complete set of warehouse tests the tests which are affiliated with the change comprises scanning SQL text of all tests in the complete set of tests, to thereby identify tests which involve data sets identified by the steps (a)-(c).

5. An apparatus for qualifying a change to one or more software modules in a data warehouse, said data warehouse comprising a database storing a plurality of data sets and said plurality of warehouse software modules, wherein prior to effecting the change to the one or more software modules, test data has been loaded into the data warehouse, a complete schedule of the plurality of software modules has been executed to populate the data sets from the loaded test data, and a complete set of warehouse tests has been run, and found to pass, in regard to the populated data sets, said apparatus comprising:
  a processor; and
  a computer readable storage device containing a program for directing the processor to execute a method comprising the steps of:
  determining if a change has been made to any of the plurality of software modules;
  selecting from the plurality of software modules the software modules which are affiliated with the change to thereby construct a reduced schedule of software modules;
  identifying from the complete set of warehouse tests the tests which are affiliated with the change to thereby identify a reduced set of tests;
  executing the reduced schedule of warehouse software whilst continuing to respect an order of the software modules in the complete schedule;
  running the reduced set of tests; and
  if no warehouse software execution errors arise from execution of the reduced schedule of warehouse software, and no warehouse test execution errors or failures arise from execution of the reduced set of tests, qualifying the change to the one or more software modules as a success, or otherwise as a failure; wherein the step of determining if a change has been made comprises periodically checking contents of a data set in the database, said data set containing metadata about software promotion of a change software module.

6. A non-transitory computer readable data storage medium containing a program for directing a processor to execute a method of qualifying a change to one or more software modules in a plurality of software modules in a data warehouse, said data warehouse comprising a database storing a plurality of data sets and said plurality of warehouse software modules, wherein prior to effecting the change to the one or more software modules, test data has been loaded into the data warehouse, a complete schedule of the plurality of software modules has been executed to populate the data sets from the loaded test data, and a complete set of warehouse tests has been run, and found to pass, in regard to the populated data sets, the method comprising the steps of:
  determining if a change has been made to any of the plurality of software modules;
  selecting from the plurality of software modules the software modules which are affiliated with the change to thereby construct a reduced schedule of software modules;
  identifying from the complete set of warehouse tests the tests which are affiliated with the change to thereby identify a reduced set of tests;
  executing the reduced schedule of warehouse software whilst continuing to respect an order of the software modules in the complete schedule;
  running the reduced set of tests; and
  if no warehouse software execution errors arise from execution of the reduced schedule of warehouse software, and no warehouse test execution errors or failures arise from execution of the reduced set of tests, qualifying the change to the one or more software modules as a success, or otherwise as a failure; wherein the step of determining if a change has been made comprises periodically checking contents of a data set in the database, said data set containing metadata about software promotion of a change software module.

7. A non-transitory computer readable data storage medium containing a program for directing a processor to execute a method of qualifying a change to one or more software modules in a plurality of software modules in a data warehouse, said data warehouse comprising a database storing a plurality of data sets and said plurality of warehouse software modules, wherein prior to effecting the change to the one or more software modules, test data has been loaded into the data warehouse, a complete schedule of the plurality of software modules has been executed to populate the data sets from the loaded test data, and a complete set of warehouse tests has been run, and found to pass, in regard to the populated data sets, the program comprising:

computer program code for determining if a change has been made to any of the plurality of software modules;

computer program code for selecting from the plurality of software modules the software modules which are affiliated with the change to thereby construct a reduced schedule of software modules;

computer program code for identifying from the complete set of warehouse tests the tests which are affiliated with the change to thereby identify a reduced set of tests;

computer program code for executing the reduced schedule of warehouse software whilst continuing to respect an order of the software modules in the complete schedule;

computer program code for running the reduced set of tests; and computer program code for, if no warehouse software execution errors arise from execution of the reduced schedule of warehouse software, and no warehouse test execution errors or failures arise from execution of the reduced set of tests, qualifying the change to the one or more software modules as a success, or otherwise as a failure; wherein the computer program code for determining if a change has been made comprises computer program code for periodically checking contents of a data set in the database, said data set containing metadata about software promotion of a change software module.

* * * * *

UNITED STATES PATENT AND TRADEMARK OFFICE
CERTIFICATE OF CORRECTION

PATENT NO. : 8,930,763 B2
APPLICATION NO. : 13/524814
DATED : January 6, 2015
INVENTOR(S) : Funnell It is certified that error appears in the above-identified patent and that said Letters Patent is hereby corrected as shown below:

In the Specification

In column 2, line 40, delete "failure" and insert -- failure. --, therefor.

In column 6, line 39, delete "6A)" and insert -- 6A). --, therefor.

In column 12, line 20, delete "example," and insert -- example. --, therefor.

In column 14, line 60, delete "hysteresis" and insert -- hysteresis. --, therefor.

In column 15, line 15, delete "test" and insert -- test. --, therefor.

In column 21, line 57, delete "schedule" and insert -- schedule. --, therefor.

In column 24, line 17, delete "implementors" and insert -- implementers --, therefor.

In column 24, line 48, delete "test;" and insert -- test. --, therefor.

Signed and Sealed this
Eighth Day of September, 2015

Michelle K. Lee
*Director of the United States Patent and Trademark Office*